United States Patent
Baldwin

(10) Patent No.: US 9,491,093 B2
(45) Date of Patent: *Nov. 8, 2016

(54) DISTRIBUTING COMMUNICATION OF A DATA STREAM AMONG MULTIPLE DEVICES

(75) Inventor: Christopher Baldwin, Algonquin, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 284 days.

This patent is subject to a terminal disclaimer.

(21) Appl. No.: 13/563,225

(22) Filed: Jul. 31, 2012

(65) Prior Publication Data

US 2014/0040493 A1 Feb. 6, 2014

(51) Int. Cl.
*H04L 12/707* (2013.01)
*H04L 29/06* (2006.01)
*H04W 84/18* (2009.01)
*H04L 29/08* (2006.01)

(52) U.S. Cl.
CPC ............. *H04L 45/24* (2013.01); *H04L 67/104* (2013.01); *H04L 67/108* (2013.01); *H04L 65/4084* (2013.01); *H04L 67/1068* (2013.01); *H04W 84/18* (2013.01)

(58) Field of Classification Search
CPC ............. H04L 65/4084; H04L 67/104; H04L 67/1068; H04L 67/108; H04W 84/18
USPC .................................................. 709/224, 231
See application file for complete search history.

(56) References Cited

U.S. PATENT DOCUMENTS

| 5,546,379 A | 8/1996 | Thaweethai et al. |
|---|---|---|
| 7,688,730 B2 | 3/2010 | Beadle |
| 7,720,098 B1 * | 5/2010 | Allen .................... H04W 28/20 370/464 |
| 7,894,470 B2 | 2/2011 | Ruckart |
| 7,894,828 B2 | 2/2011 | Dawson et al. |
| 8,068,450 B2 | 11/2011 | Kozisek |
| 8,170,056 B2 | 5/2012 | Allen et al. |
| 2002/0004788 A1 | 1/2002 | Gros et al. |

(Continued)

FOREIGN PATENT DOCUMENTS

WO 9951001 10/1999

OTHER PUBLICATIONS

Adtran, Inc., "Why Buy ATLAS Video Switch, ATLAS 800 Series," Mar. 2004 (2 pages).

(Continued)

*Primary Examiner* — Jeong S Park
(74) *Attorney, Agent, or Firm* — Hanley, Flight & Zimmerman, LLC

(57) ABSTRACT

Methods, apparatus and articles of manufacture for distributing communication of a data stream among multiple devices are disclosed. Example methods disclosed herein include receiving a request from a primary device to establish a shared connection to distribute communication of a first data stream among a plurality of devices including the primary device and a plurality of secondary devices. Such example methods also include providing, in response to the request, network addresses to the primary device to be used to establish respective data connections with the plurality of devices. Such example methods further include splitting the first data stream into a plurality of partial data streams to be communicated respectively to the plurality of devices via the respective data connections, the partial data streams, when aggregated, forming the first data stream.

20 Claims, 9 Drawing Sheets

(56) References Cited

U.S. PATENT DOCUMENTS

| | | | |
|---|---|---|---|
| 2002/0091843 A1* | 7/2002 | Vaid | H04L 12/2865 709/230 |
| 2005/0021621 A1 | 1/2005 | Welch et al. | |
| 2005/0025163 A1* | 2/2005 | Christie, IV | H04L 45/24 370/401 |
| 2005/0074017 A1 | 4/2005 | Qian et al. | |
| 2006/0070115 A1 | 3/2006 | Yamada et al. | |
| 2006/0116149 A1* | 6/2006 | Dunn | H04W 72/005 455/518 |
| 2006/0168290 A1 | 7/2006 | Doron | |
| 2006/0174160 A1* | 8/2006 | Kim | H04L 12/2602 709/231 |
| 2007/0050522 A1* | 3/2007 | Grove | H04L 29/12066 709/246 |
| 2007/0127386 A1 | 6/2007 | Joshi et al. | |
| 2007/0136452 A1 | 6/2007 | Coleman | |
| 2007/0147438 A1 | 6/2007 | Lok | |
| 2008/0075111 A1 | 3/2008 | Hu et al. | |
| 2008/0175188 A1 | 7/2008 | Kozisek | |
| 2008/0262974 A1 | 10/2008 | Kozisek | |
| 2008/0299988 A1 | 12/2008 | Dawson et al. | |
| 2008/0301017 A1 | 12/2008 | Dawson et al. | |
| 2009/0046740 A1 | 2/2009 | Ruckart | |
| 2009/0083426 A1 | 3/2009 | Cagenius | |
| 2009/0182813 A1 | 7/2009 | McCartie et al. | |
| 2010/0061401 A1 | 3/2010 | Nakahira | |
| 2010/0287296 A1 | 11/2010 | Riggert et al. | |
| 2010/0293097 A1* | 11/2010 | Pomeroy | H04L 63/0457 705/58 |
| 2010/0318662 A1 | 12/2010 | Wie et al. | |
| 2011/0110324 A1* | 5/2011 | Ruckart | H04W 28/18 370/329 |
| 2013/0114426 A1 | 5/2013 | Polk et al. | |
| 2013/0142040 A1 | 6/2013 | Fryer et al. | |
| 2014/0040364 A1* | 2/2014 | Baldwin | H04L 65/4076 709/204 |
| 2014/0040421 A1* | 2/2014 | Baldwin | G06F 15/16 709/217 |

OTHER PUBLICATIONS

Kear, Sam, "Dual Wan Router—How to Load Balance Using Sen," http://skear.hubpages.com/hub/Dual-Wan-Router-How-To-Build-One-On-a-Budget, accessed on Nov. 29, 2011 (7 pages).

Vicomsoft, "Bandwidth Aggregation, Bonding and Teaming," http://www.vicomsoft.us/learning-center/bandwidth-aggregation-bonding-and-teaming/, accessed on Nov. 29, 2011 (14 pages).

Wikipedia, "Channel Bonding," http://en.wikipedia.org/wiki/Channel_bonding, accessed on Apr. 10, 2012 (2 pages).

Wikipedia, "Link Aggregation," http://en.wikipedia.org/wiki/Link_aggregation, accessed on Apr. 10, 2012 (8 pages).

Wikipedia, "Stackable Switch," http://en.wikipedia.org/wiki/Stackable_switch, accessed on Nov. 29, 2011 (3 pages).

U.S. Appl. No. 13/311,462, "Pooling Available Network Bandwidth From Multiple Devices," filed Dec. 5, 2012 (38 pages).

United States Patent and Trademark Office, "Non-Final Office Action," issued in connection with U.S. Appl. No. 13/311,462, mailed Feb. 19, 2014, 37 pages.

United States Patent and Trademark Office, "Final Office Action", issued in connection with U.S. Appl. No. 13/311,462, dated Jun. 13, 2014, 35 pages.

United States Patent and Trademark Office, "Non-Final Office Action," issued in connection with U.S. Appl. No. 13/563,218, mailed Jan. 23, 2014, 18 pages.

United States Patent and Trademark Office, "Non-Final Office Action," issued in connection with U.S. Appl. No. 13/563,234, mailed Apr. 17, 2014, 13 pages.

United States Patent and Trademark Office, "Final Office Action", issued in connection with U.S. Appl. No. 13/563,218 dated Aug. 20, 2014 (20 pages).

United States Patent and Trademark Office, "Final Office Action", issued in connection with U.S. Appl. No. 13/563,234, dated Sep. 29, 2014 (11 pages).

United States Patent and Trademark Office, "Notice of Allowance", issued in connection with U.S. Appl. No. 13/311,462, dated Oct. 30, 2014 (8 pages).

United States Patent and Trademark Office, "Non-Final Office Action", issued in connection with U.S. Appl. No. 13/563,218, dated Jun. 10, 2015 (22 pages).

United States Patent and Trademark Office, "Non-Final Office Action", issued in connection with U.S. Appl. No. 13/563,234, dated May 19, 2015 (11 pages).

United States Patent and Trademark Office, "Final Office Action", issued in connection with U.S. Appl. No. 13/563,234, dated Sep. 22, 2015 (10 pages).

United States Patent and Trademark Office, "Notice of Allowance", issued in connection with U.S. Appl. No. 13/563,218, dated Jan. 29, 2016 (15 pages).

United States Patent and Trademark Office, "Notice of Allowance", issued in connection with U.S. Appl. No. 13/563,234, dated May 5, 2016 (16 pages).

* cited by examiner

DISTRIBUTING COMMUNICATION OF A DATA STREAM AMONG MULTIPLE DEVICES

FIELD OF THE DISCLOSURE

This disclosure relates generally to data communications and, more particularly, to distributing communication of a data stream among multiple devices.

BACKGROUND

Consumers are becoming accustomed to near ubiquitous access to Internet-based and web-based services and applications. In the past, data intensive applications, such as steaming video, on-demand video, video conferencing, etc., were limited to devices, such as personal computers, set-top boxes, stand-alone video conferencing systems, etc., having dedicated, high-speed (e.g., broadband) data connections provided by an Internet service provider (ISP). Today, consumers have access to a plethora of electronic devices, including smartphones, tablet computers, personal data devices, personal digital assistants, etc., that support Internet connectivity, and may have sufficient processing power to support at least some media-rich applications. However, while a consumer may own or have access to a number of such electronic devices, the data bandwidth capabilities of each individual device may be limited such that none of the consumer's devices, on its own, can support the data transfer speeds associated with a data intensive application the consumer wishes to access.

BRIEF DESCRIPTION OF THE DRAWINGS

Wherever possible, the same reference numbers will be used throughout the drawing(s) and accompanying written description to refer to the same or like elements, parts, etc.

DETAILED DESCRIPTION

Figure 1:
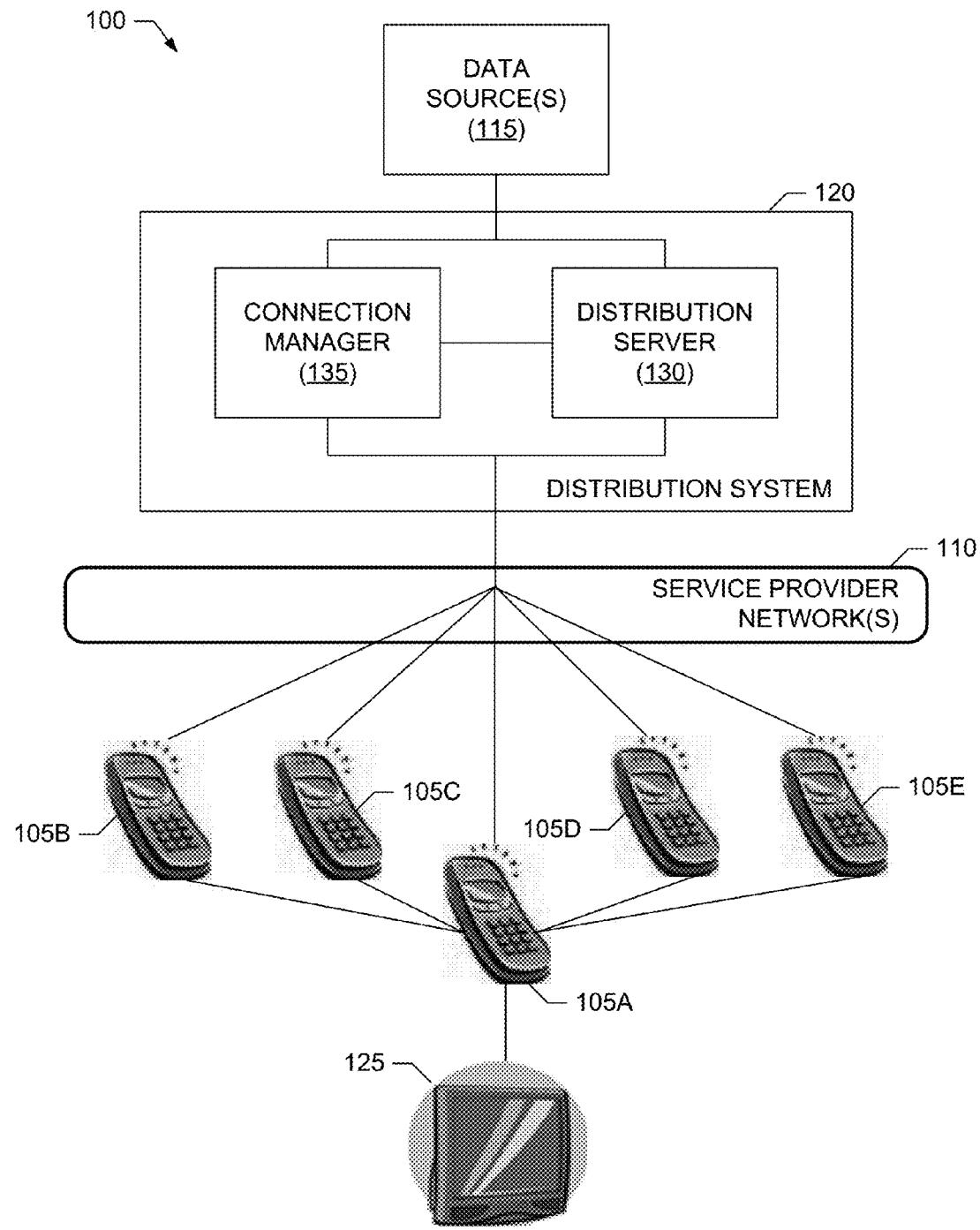
FIG. 1 is block diagram of an example communication system capable of distributing communication of a data stream among multiple example devices as disclosed herein.

Methods, apparatus and articles of manufacture (e.g., storage media) for distributing communication of a data stream among multiple devices are disclosed herein. Example methods disclosed herein to distribute communication of a first data stream among multiple devices include receiving a request from an example primary device to establish a shared connection to distribute the communication of the first data stream among a group of devices. In some such examples, the group of devices includes the primary device and a group of secondary devices. Such example methods also include providing, in response to the request, network addresses to the primary device to be used to establish respective data connections with the group of devices. Such example methods further include splitting the first data stream into a group of partial data streams to be communicated respectively to the group of devices via the respective data connections. In such examples, the partial data streams, when aggregated, form the first data stream.

In some such examples, a number of network addresses provided to the primary device corresponds to a number of secondary devices indicated in the request as being included in the shared connection. In such examples, the primary device is to distribute the network addresses to the group of secondary devices to be used to establish respective data connections with the group of secondary devices.

Additionally or alternatively, some such example methods further include establishing a primary data connection with the primary device in response to receiving the request. Such example methods also include establishing respective secondary data connections with the group of secondary devices in response to receiving communications from the group of secondary devices at the network addresses provided to the primary device. In some examples, each of the group of secondary devices is associated with a respective different network address that was provided to the primary device.

Additionally or alternatively, some such example methods further include determining first device capability information for the primary device, and establishing the primary data connection with the primary device based on the first device capability information. Such example methods also include determining respective device capability information for each of the group of secondary devices, and establishing the respective secondary data connections with the group of secondary devices based on the respective device capability information determined for each of the group of secondary devices. In some such examples, determining the first device capability information involves processing a first ping message sent to the primary device, and determining the respective device capability information for each of the group of secondary devices involves processing respective ping messages sent to the plurality of secondary devices. Additionally or alternatively, in some such examples, establishing the primary data connection with the primary device includes associating at least one of a first bandwidth limit or a first data rate limit with the primary data connection based on the first device capability information. Additionally or alternatively, in some such examples, establishing the respective secondary data connections with the group of secondary devices includes associating at least one of a respective bandwidth limit or a respective data rate limit with each of the respective secondary data connections based on the respective device capability information determined for each of the group of secondary devices.

Additionally or alternatively, some such example methods further include detecting a change in status of the shared connection. Such example methods can also include adjusting the splitting of the first data stream to account for the change in status.

Further example methods, apparatus and articles of manufacture (e.g., storage media) for distributing communication of a data stream among multiple devices are described in greater detail below.

As noted above, a consumer may have access to multiple electronic devices that support Internet connectivity, but none of these devices may have sufficient data bandwidth capability, on its own, to support the data intensive applications the consumer may wish to access. For example, a lack of sufficient data bandwidth may prevent a consumer from using a given one of her electronic devices to view a streaming video, participate in a video conference, etc., or may at least degrade the consumer's experience when accessing such applications. In many circumstances, the consumer has access to a number of electronic devices having a combined bandwidth that would be sufficient to support the desired data intensive application. Thus, while the total bandwidth available to the consumer would be sufficient, the distribution of this bandwidth among multiple, individual devices (e.g., which may be of different types) has, in the past, prevented this available bandwidth from being used to its full potential.

Example methods, apparatus and articles of manufacture disclosed herein can overcome at least some of these prior limitations, and enable the bandwidth from multiple devices to be combined. For example, such disclosed example methods, apparatus and articles of manufacture distribute communication of a data stream (e.g., such as a high-speed data stream corresponding to a streamlining video application, a video conferencing application, etc.) among the multiple devices, thereby enabling the limited bandwidth of each device to be combined to realize a data connection (referred to herein as a shared connection) having a higher overall bandwidth. Prior techniques for combining the bandwidth of separate communication links, such as link bonding or aggregation, can be limited in that they are restricted to use with fixed, or static, communication links implemented using the same technology and/or provided by the same service provider, and/or require the communication links being combined to terminate at the same communication endpoint.

Unlike such prior techniques, example methods, apparatus and articles of manufacture disclosed herein enable distribution of the communication of a data stream among multiple, different endpoints (e.g., electronic devices), which may be the same or different and which may receive service (e.g., Internet service) from the same or different providers. Also, example methods, apparatus and articles of manufacture disclosed herein support distribution of the data stream among different data connections in accordance with the different device capabilities of the devices with which the data connections are established. Furthermore, example methods, apparatus and articles of manufacture disclosed herein support flexible combining of device bandwidth such that, for example, devices may be added to and/or removed from the shared connection while the data stream is still being communication. Further aspects of the disclosed example methods, apparatus and articles of manufacture are described in greater detail below.

Turning to the figures, a block diagram of an example communication system 100 capable of distributing communication of a data stream among multiple example devices as disclosed herein is illustrated in FIG. 1. The communication system 100 includes multiple example user devices 105A-E in communication with one or more example service provider networks 110. The service provider network(s) 110 can correspond to any type of service provider's network, such as a mobile service provide network, a broadband service provider network, a cable service provider network, a satellite service provider network, an Internet service provider (ISP) network, etc., capable of providing access to the Internet and/or any service-oriented and/or content delivery network. In the example communication system 100 of FIG. 1, Internet service is provided to each of the multiple user devices 105A-E by the same or different service provider network(s) 110. Furthermore, the user devices 105A-E may have different device capabilities such that, for example, some or all of the user devices 105A-E have different respective bandwidth or data rate limits for data received from and/or transmitted to the service provider network 110.

Although the user devices 105A-E are depicted as mobile phones in FIG. 1, the user devices 105A-E are not limited thereto. For example, the user devices 105A-E can each be any device that is capable of accessing the service provider(s) 110, which in turn provides access to the Internet and/or any other type(s) of content delivery and/or service-oriented network(s). Each user device 105A-E is also able to exchange data with other external device(s), such as via tethering and/or any external data connection (such as a Wi-Fi connection, a Bluetooth connection, a universal serial bus (USB) connection, a docking connection, etc.). As such, the user devices 105A-E can be implemented by, for example, mobile phones (such as smartphones, cellular phones, 3G, 4G or long term evolution (LTE) wireless devices, etc.), wireless access points (such as Wi-Fi devices, Bluetooth devices, aircards, etc.), personal data devices (such as personal digital assistants (PDAs), e-readers, etc.), broadband modems (such as DSL modems, cable modems, satellite modems, etc.) and/or any other type(s) of electronic devices or combinations thereof.

In the illustrated example of FIG. 1, the service provider network(s) 110 provide the user devices 105A-E with access to one or more example data sources 115. The data sources(s) 115 include, for example, one or more streaming media sources (e.g., such as streaming services offered by Netflix®, Hulu®, etc.), one or more on-demand media download sources (e.g., such as Apple iTunes®), one or more video conferencing services, etc. The data source(s) 115 can also include other user devices (not shown) capable of uploading content (e.g., such as video chat content) that is able to be received by the user devices 105A-E.

The example communication system 100 of FIG. 1 further includes an example distribution system 120 that enables the communication of a particular data stream from the data sources(s) 115 to be distributed among the multiple user devices 105A-E. For example, the distribution system 120 may be used to distribute portions of a data stream, which is being communicated from a data source 115 to one of the user devices 105A-E, such as the user device 105A, to some or all of the multiple user devices 105A-E. As described in greater detail below, the partial data streams received by some or all of the user devices 105A-E are then aggregated to form the original data stream, which may be processed by the user device 105A (e.g., for presentation by the user device 105A) and/or forwarded to an example output device 125 (e.g., for presentation by the output device 125). In this way, the individual bandwidths and/or data transmission capacity limits of each of the user devices 105A-E can be combined to yield an aggregated bandwidth and/or data transmission capacity capable of carrying a data stream that would not have been supported by the user devices 105A-E otherwise. The output device 125 of the illustrated example can be implemented by any type of device capable of processing, presenting and/or otherwise using a data stream, such as a television, a set-top box, a personal computer, etc., and/or any other type of user device, such as device similar to the user devices 105A-E described above.

To support distributing communication of a data stream among the multiple user devices 105A-E as disclosed herein, the distribution system 120 of the illustrated example further includes an example distribution server 130 and an example connection manager 135. As described in greater detail below, the distribution server 130 is responsible for splitting a complete data stream being provided by a data source 115 into multiple partial data stream to be communicated to the respective user devices 105A-E. As described in greater detail below, the connection manager 135 is responsible for establishing, monitoring and otherwise managing the data connections with the user devices 105A-E that collectively form the shared connection via which the original data stream is communicated as a group of partial data stream to the user devices 105A-E.

In the example communication system 100 of FIG. 1, the distribution system 120, which includes the distribution server 130 and the connection manager 135, may or may not be included in the service provider network(s) 110. For example, the distribution system 120 may be implemented by a content delivery network or other service-oriented network connecting the data source(s) 115 with the service provider network(s) 110. Because the distribution system 120 may be implemented outside of the service provider network(s) 110, the connection manager 135 may not be able to rely on the service provider network(s) 110 to establish the data connections with the secondary devices 105B-E among which the data stream provided by the target data source 115 is to be distributed. For example, some of the secondary devices 105B-E may receive service from different service provider network(s) 110, and the service provider network(s) 110 may act as pass-through for the communication messages associated with establishing the data connections for data stream distribution. As such, in some examples, the service provider network(s) 110 in the communication system 100 of FIG. 1 route the shared connection requests (described in greater detail below) to the separate distribution system 120 without establishing the data connections disclosed herein.

An example of distributing communication of a data stream among the multiple user devices 105A-E in the context of the communication system 100 is now described. Consider, for example, a scenario in which a user endeavors to use the user device 105A to access a data source 115 to begin data streaming or downloading using data stream distribution as disclosed herein. In such examples, the user device 105A is referred to herein as a primary device and is responsible for establishing the shared connection between the user devices 105A-E, managing the shared connection, selecting the target data source 115, etc. The other user devices 105B-E are referred to herein as secondary devices to be included in the shared connection that is to convey the data stream from the selected data source 115 to the user devices 105A-E.

In such examples, the user uses the primary device 105A to establish local communication links with one or more of the secondary user devices 105B-E. For convenience, and without loss of generality, it is assumed that all of the user devices 105A-E are to be included in the shared connection. For example, the user devices 105A-E can establish an ad-hoc network, tethering connections and/or other local communication links via any appropriate technology, such as Wi-Fi connections, Bluetooth connections, USB connections, a docking connections, etc. In the illustrated example, the primary device 105A uses the local communication links to determine the number of secondary devices 105B-E that are to be included in the shared connection associated with a particular target data stream. The primary device 105A then sends a shared connection request, for receipt by the distribution system 120, which requests that a shared connection be established to distribute a data stream from a target data source 115. In the illustrated example, the shared connection request identifies the target data source 115 and includes the number of secondary user devices 105B-E to be included in the shared connection.

In the example communication system 100 of FIG. 1, the distribution system 120 is not implemented in the service provider network(s) 110. Accordingly, the receiving service provider network 110 forwards the shared connection request to the distribution system 120 and, in particular, the connection manager 135, to enable the shared connection among the user devices 105A-E to be established. In the illustrated example, the distribution system 120 in combination with the user devices 105A-E implement functionality to enable respective data connections (also referred to herein as secondary data connections) to be established with the secondary devices 105B-E. (It is assumed that a data connection, also referred to herein as a primary data connection, is already established with the primary device 105A as the request is received as a data communication from the primary device 105A.) For example, the distribution system 120 in combination with the user devices 105A-E can implement functionality to enable the user devices 105A-E to initiate establishment of their respective data connections via which data streaming is to be distributed. For example, the distribution system 120 can provide a set of network addresses (e.g., uniform resource identifiers (URIs), IP addresses, etc.) and/or a sharing code to be used by the user devices 105A-E to establish the data connections for use in distributing a data stream, and to associate the user devices 105A-E with a particular (e.g., unique) group of devices that is to receive a particular data stream.

For example, in the communication system 100 of FIG. 1, the service provider network 110 serving the primary device 105A receives the shared connection request from the primary device 105A and forwards it to the connection manager 135. In response to receiving the request, the connection manager 135 returns a set of network addresses, such as IP addresses, URIs, etc., to the primary device 105A to be used by the second devices 105B-E to establish respective data connections (also referred to herein as secondary data connections) with the distributions system 120. (It is assumed that the primary data connection is already established with the primary device 105A when the request is received by the distribution system 120 from the primary device 105A.) For example, the connection manager 135 may return a number of network addresses corresponding to the number of secondary devices indicated in the shared connection request such that each secondary device 105B-E can be associated with a different respective network address. In response to receiving the network addresses from the connection manager 135, the primary device 105A of the illustrated example forwards the network addresses to the secondary devices 105B-E via the local communication links (e.g., with each secondary device receiving a different network address). Each secondary device 105B-E then sends a request to the network address it received from the primary device 105A, which is received by the connection manager 135 of the distribution system 120. Because the connection manager 135 knows which network addresses it assigned to a particular shared connection request, the connection manager 135 can associate the secondary devices 105B-E with a particular shared connection request based on the network addresses used by the secondary devices 105B-E to contact the distribution system 120. Thus, in response to receiving a communication from a particular secondary device 105B-E at the provided network address, the connection manager 135 can establish a data connection with the particular secondary device 105B-E and associate it with the proper shared connection request.

Additionally or alternatively, in response to receiving the shared connection request from the primary device 105A, the connection manager 135 may return a sharing code, or a shared connection code, such as a unique number or alphanumeric sequence, to be associated with that particular shared connection request. In response to receiving the sharing code from the connection manager 135, the primary device 105A of the illustrated example forwards the sharing code to the secondary devices 105B-E via the local communication links. The secondary devices 105B-E can then include this code in a request sent to the distribution system 120 to cause the connection manager 135 to associate, based on the sharing code, the secondary devices 105B-E with the particular shared connection requested by the primary device 105A. In some examples, the sharing code can be used with or without a group of network addresses also being provided by the connection manager 135. For example, user devices, such as the devices 105A-E, could be configured to use just a single network address (or relatively small number of network addresses) to contact the distribution system 120 with a sharing request including their assigned sharing code. In such examples, the connection manager 135 can rely on the sharing code to group user devices into different requested shared connections, and can then establish the data connections with the user devices accordingly.

In some examples, some or all of the user devices 105A-E each individually send separate, initial shared connection requests to the distribution system 120 before being associated with a particular shared connection. In such examples, the connection manager 135 may assign and return a respective sharing code to each device. The user devices 105A-E may then exchange their respective sharing codes amongst each other (e.g., via the local communication links established among the devices) to thereby identify which user devices 105A-E are to be included in the shared connection. In such examples, one of the user devices 105A-E, such as the primary user device 105A, then sends a second, or supplemental, shared connection request to the distribution system 120, which identifies (e.g., using the assigned sharing codes) the user devices 105A-E to be included in the shared connection, and the target data source 115.

Furthermore, in some such examples, one or more of the user devices 105A-E may include location information in the individual, initial shared connection request(s) sent to the distribution system 120. In such examples, the connection manager 135 may identify groups of user devices 105A-E that are geographically co-located (e.g., within a specified or configured geographical distance of each other) as likely candidates for inclusion in a shared connection. Accordingly, the connection manager 135 may then assign a single sharing code, or given ranges of sharing codes, to user devices 105A-E that are geographically co-located. Then, when the user devices 105A-E exchange sharing codes amongst each other, the values of the sharing codes can be evaluated (e.g., to identify which user devices have codes that are the same as, or within a range of, the sharing code assigned to a receiving user device) to determine which other user devices 105A-E are within range and may be included in a shared connection.

In some examples, the connection manager 135 further establishes the data connections with the devices 105A-E by associating respective data transmission characteristic(s) with each of the data connections. In the illustrate example, the data transmission characteristic(s) are determined by the connection manager 135 based on the device capability information obtained for the user devices 105A-E. For example, the connection manager 135 can allocate different bandwidth and/or data rate limits to some or all of the data connections based on the device capability information for each of the devices 105A-E.

In the illustrated example, the connection manager 135 actively determines the device capability information for the user devices 105A-E (e.g., because the connection manager 135 may not be able to rely on receiving such information from the service provider network(s) 110). For example, the connection manager 135 may exchange communication messages, such a network ping messages, with the primary device 105A to determine device capability information, such as bandwidth and/or data rate capabilities, network latencies, etc. Similarly, the connection manager 135 may exchange communication messages, such a network ping messages, with each of the secondary devices 105B-E included in a shared connection request to determine respective device capability information for the secondary devices 105B-E, such as bandwidth and/or data rate capabilities, network latencies, etc. Then, as described above, the connection manager 135 can associate respective data transmission characteristic(s) with the data connections established with the user devices 105A-E, with the data transmission characteristic(s) being based on the determined device capability information.

After establishing the data connections with the respective devices 105A-E and determining their respective data transmission characteristics, the connection manager 135 then initiates the data stream from target data source 115 using the target data source identification information included in the shared connection request. The connection manager 135 also invokes the distribution server 130 to begin splitting of the complete data stream among the respective data connections with the user devices 105A-E.

In the illustrated example, the distribution server 130 receives the complete data stream from the target data source 115 corresponding to the target data source identification information included in the shared connection request. The distribution server 130 splits the complete data stream into partial data streams to be communicated to the user devices 105A-E using the communication paths established by the connection manager 135 and the service provider network 110. In some examples, the distribution server 130 generates the partial data streams having different data transmission characteristics, such as different bandwidth limits and/or data rate limits, according to the respective data transmission characteristics associated with the communication paths established with the user devices 105A-E. In some examples, the distribution server 130 may also perform transcoding to change/modify one or more data stream characteristics when splitting the complete data stream into the partial data streams, as described in greater detail below.

In the illustrated example, the user devices 105A-E receive their respective partial bit streams from the distribution server 130 via the established communication paths. The received partial bits streams are then aggregated (e.g., possibly after reordering to account for different data packet arrival times at the different user devices 105A-E) to form the complete data stream being provided by the target data source 115. Any appropriate aggregation technique can be employed in the communication system 100 to aggregate the partial data streams received by the user devices 105A-E. For example, as illustrated in the example of FIG. 1, the secondary devices 105B-E can forward their respective received partial data streams to the primary device 105A via the local communication links previously established (as described above) between the user devices 105A-E. In such examples, the primary device 105A aggregates the partial data streams received from the secondary devices 105B-E with its own received partial data stream to form the complete data stream being provided by the target data source 115. The primary device 105A can the process/present the complete data stream itself, or convey the complete data stream to the output device 125 for processing/presentation.

Additionally or alternatively, in some examples, the user devices 105A-E support hierarchical aggregation of the partial data streams to form the complete data stream provided by the target data source 115. In such examples, subsets of the user devices 105A-E work cooperatively to perform a first level of data stream aggregation (e.g., which can be performed in parallel among the different device subsets). For example, the secondary device 105B could perform aggregation of the partial data streams received by the secondary devices 105B-C, and the secondary device 105D could perform aggregation of the partial data streams received by the secondary devices 105D-E. The resulting aggregated streams from the first level of aggregation can then be provided to another device, such as the primary device 105A, to perform a next level of data stream aggregation. Additional levels of aggregation can be implemented, as appropriate.

Additionally or alternatively, in some examples, the user devices 105A-E provide their respective received partial data streams to the output device 125, which is responsible for performing the data stream aggregation.

In some examples, the connection manager 135 and/or the primary device 105 of the communication system 100 monitor the status of the shared connection established between the distribution system and the user devices 105A-E to determine whether to modify distribution of the complete data stream among the multiple devices 105A-E. For example, if one or more of the user devices 105A-E is/are no longer available (e.g., due to leaving the operating area, being turned-off, etc.), the connection manager 135 and/or the primary device 105 can detect such a change and cause the complete data stream to be distributed just over the remaining user devices 105A-E. Additionally or alternatively, a new user device (not shown) may become available (e.g., by entering the operating area, by being turned on, etc.) for inclusion in the group of devices 105A-E among which the complete data stream is to be distributed. In some examples, the connection manager 135 and/or the primary device 105 can detect such a change and cause the complete data stream to be distributed over the new group user devices 105A-E. Such monitoring capabilities enables the communication system 100 to continue providing the complete data stream from the target data source to the user devices 105A-E even as the composition of the user devices 105A-E changes.

Although five user devices 105A-E are illustrated in the example of FIG. 1, the communication system 100 can support distributing the communication of a data stream among any number of user devices 105A-E. The communication system 100 can also support any number and/or type(s) of data sources 115 and output devices 125. Furthermore, the communication system 100 can include any number of service provider networks 110 providing the user devices 105A-E with access to the Internet and/or any other content delivery and/or service oriented network(s). Moreover, although one distribution system 120 is illustrated in the example of FIG. 1, the communication system 100 can support any number of distribution systems 120 to distribute communication of data streams among multiple devices as disclosed herein. Furthermore, although the distribution system 120 is illustrated as being implemented outside of the service provider network(s) 110 in the example of FIG. 1, in other examples the distribution system 120 may be implemented by/in a service provider network 110. In such examples, the distribution system 120 may obtain, for example, the above-mentioned location information and/or device capability information for one or more of the user devices 105A-E directly from the service provider network 110 implementing the distribution system 120, rather than interacting with the user devices 105A-E to obtain such information.

Figure 2:
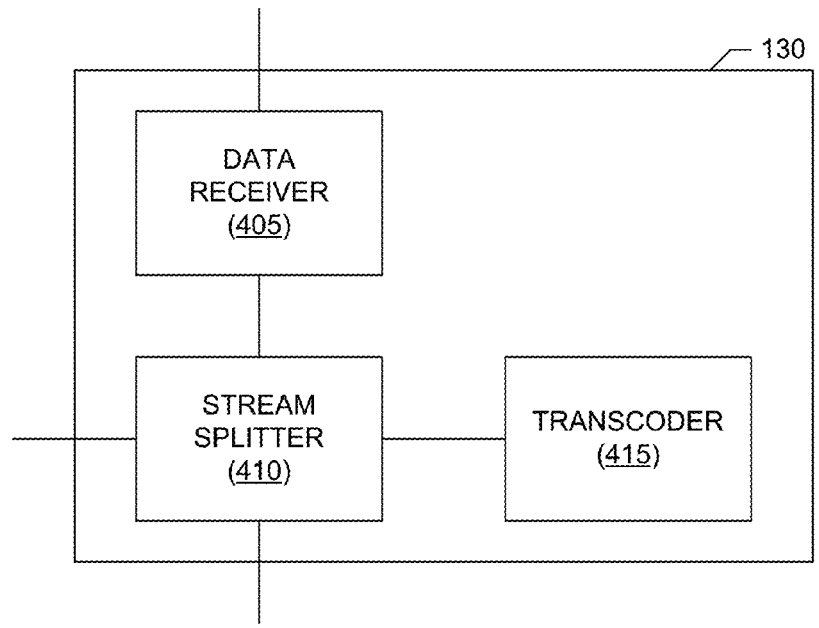
FIG. 2 is block diagram of an example distribution server that may be used to implement the example communication system of FIG. 1.

A block diagram depicting an example implementation of the distribution server 130 of FIG. 1 is illustrated in FIG. 2. The example distribution server 130 of FIG. 2 includes an example data receiver 405 to receive data stream(s) from one or more data sources, such as the data source(s) 115. The example distribution server 130 of FIG. 2 also includes an example stream splitter 410 to split an incoming data stream from a data source into a group of partial streams to be distributed to user devices, such as the user devices 105A-E, via established data connections. In some examples, the stream splitter 410 is configured (e.g., by the connection manager 135) with respective data transmission characteristics for each of the data connections and, thus, for each of the partial data streams into which the incoming data stream is to be split. For example, each data connection and associated partial data stream can be associated with a respective bandwidth limit, data rate limit, etc., tailored to the device capabilities of the particular user device that is to receive that partial data stream. Accordingly, in some examples, the stream splitter 410 may split the incoming data stream into partial data streams having different data transmission characteristics, whereas in other examples, the stream splitter 410 may split the incoming data stream into partial data streams having similar, or the same, data transmission characteristics.

In some examples, the example distribution server 130 of FIG. 2 further includes an example transcoder 415 to transcode the data as it is being split from the incoming data stream into the partial data streams. The transcoder 415 performs transcoding to modify the characteristics of the data payload and/or control information included in the partial data streams generated by the stream splitter 410 from the incoming data stream. For example, based on the device capabilities of a particular user device associated with a particular data stream, the transcoder 415 may be used to modify the partial data stream to change the block size of the data payload, perform data interpolation on the data payload, re-encode control information included in the partial data stream, etc., to conform the partial data stream with one or more communication protocols supported by the user device. Accordingly, the transcoder 415 can support any number and/or type(s) of transcoding algorithms tailored to the expected device capabilities of user devices that are to receive the partial data streams generated by the distribution server 130.

Figure 3:
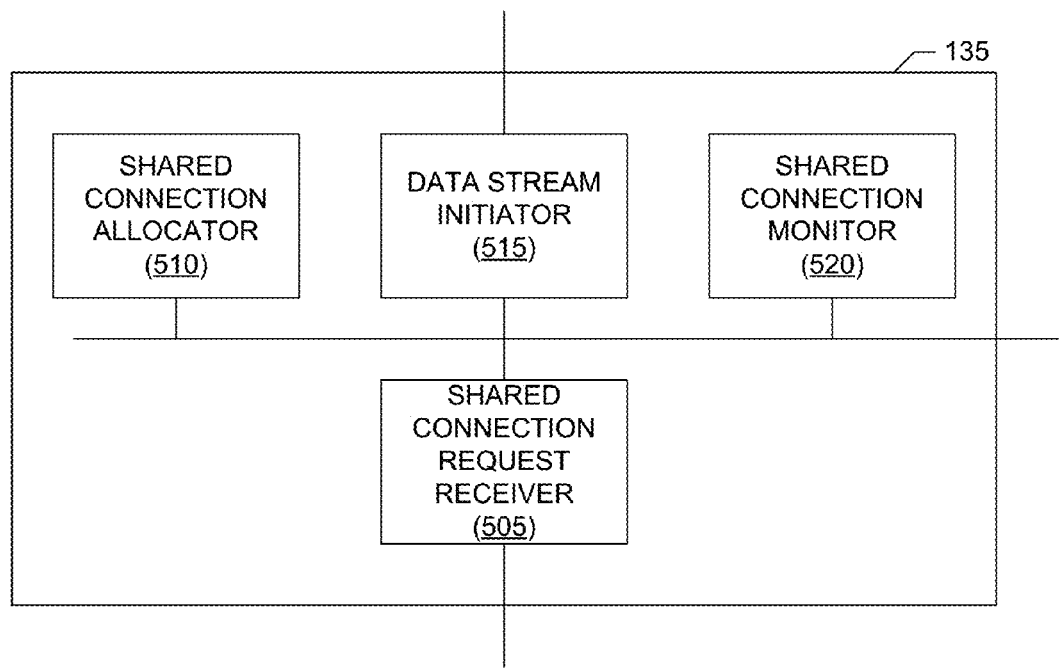
FIG. 3 is block diagram of an example connection manager that may be used to implement the example communication system of FIG. 1.

A block diagram depicting an example implementation of the connection manager 135 of FIG. 1 is illustrated in FIG. 3. The example connection manager 135 of FIG. 3 includes an example shared connection request receiver 505 to receive shared connection requests from user devices, such as the primary user device 105A. As described above, a shared connection request includes, for example, data source identification information identifying a target data source, such as a data source 115, from which the primary user device 105A is requesting that a data stream be provided. In some examples, the shared connection request can include information indicating the number of secondary user devices (or the number of user devices in total) that are to be included in the shared connection among which the data stream from the identified target source is to be distributed, as described above.

The example connection manager 135 of FIG. 3 also includes an example shared connection allocator 510 to allocate data connections for the user devices to be included in a shared connection established in response to a shared connection request received by the shared connection request receiver 505. In some examples, the shared connection allocator 510 processes the shared connection request received by the shared connection request receiver 505 to determine a number of user devices to be included in the shared connection being requested (e.g., by evaluating the number of secondary user devices or total user devices indicated in the shared connection request). The shared connection allocator 510 then allocates a number of data connections corresponding to the number of user devices. The shared connection allocator 510 also generates a response to the shared connection request containing, for example, a number of network addresses (e.g., IP addresses, URIs, etc.) to be used by the user devices as destination addresses of the distribution system 120 that are to be contacted to establish the data connections for receiving the partial data streams corresponding to the target data source identified in the shared connection request. Additionally or alternatively, the shared connection allocator 510 can include a sharing code or other identifier to be used by the user devices when contacting the distribution system 120 to establish the data connections for receiving the partial data streams corresponding to the target data source identified in the shared connection request. In such examples, the sharing code is used by the shared connection allocator 510 to associated user devices with particular shared connection requests.

In some examples, the shared connection allocator 510 actively determines device capability information for the user devices to be included in the requested shared connection. For example, the shared connection allocator 510 may exchange communication messages, such as network ping messages, with a primary device in response to receiving the shared connection request to determine device capability information, such as bandwidth and/or data rate capabilities, network latencies, etc. Similarly, in response to receiving a message from a secondary device at a provided network address and/or including an appropriate sharing code, the shared connection allocator 510 may exchange communication messages, such as network ping messages, with the secondary devices to determine respective device capability information, such as bandwidth and/or data rate capabilities, network latencies, etc., for the secondary device. The shared connection allocator 510 then uses this device capability information to determine data transmission characteristics to be associated with the data connection established with the user devices, as described above.

The example connection manager 135 of FIG. 3 further includes an example data stream initiator 515 to initiate a data stream from the target data source identified in the shared connection request received by the shared connection request receiver 505. For example, the data stream initiator 515 can initiate data streaming or another type of data download from the target data source, and indicate that the destination of the stream is a network address that is associated with the distribution system 120 and is further associated with the particular shared connection that was established in response to the received shared connection request. In such examples, the distribution system 120 knows that a data stream received at an address associated with a particular shared connection is to be distributed into partial data streams by the distribution server 130 as disclosed herein.

In some examples, the example connection manager 135 of FIG. 3 includes an example shared connection monitor 520 to monitor the status of shared connections being used to distribute the communication of data streams among multiple user devices. For example, to monitor a shared connection associated with the user devices 105A-E, the shared connection monitor 520 can monitor for status update messages received from the primary user device 105A to indicate that the composition of the group of user devices 105A-E associated with the shared connection has changed (e.g., because user device(s) have entered or left the group). Additionally or alternatively, in some examples the shared connection monitor 520 can monitor that status of partial data streams being communicated to the group of user devices 105A-E associated with the shared connection to determine whether one or more of the streams has stalled (e.g., because acknowledgment(s) have not been received from one or more of the user devices 105A-E). In the illustrated example, in response to detecting a change in status of a shared connection, the shared connection monitor 520 notifies the shared connection allocator 510 to cause the shared connections with the user devices 105A-E to be updated accordingly (e.g., to add/delete user connections, to adjust the allocation of data to the different partial data streams, etc.).

Figure 4:
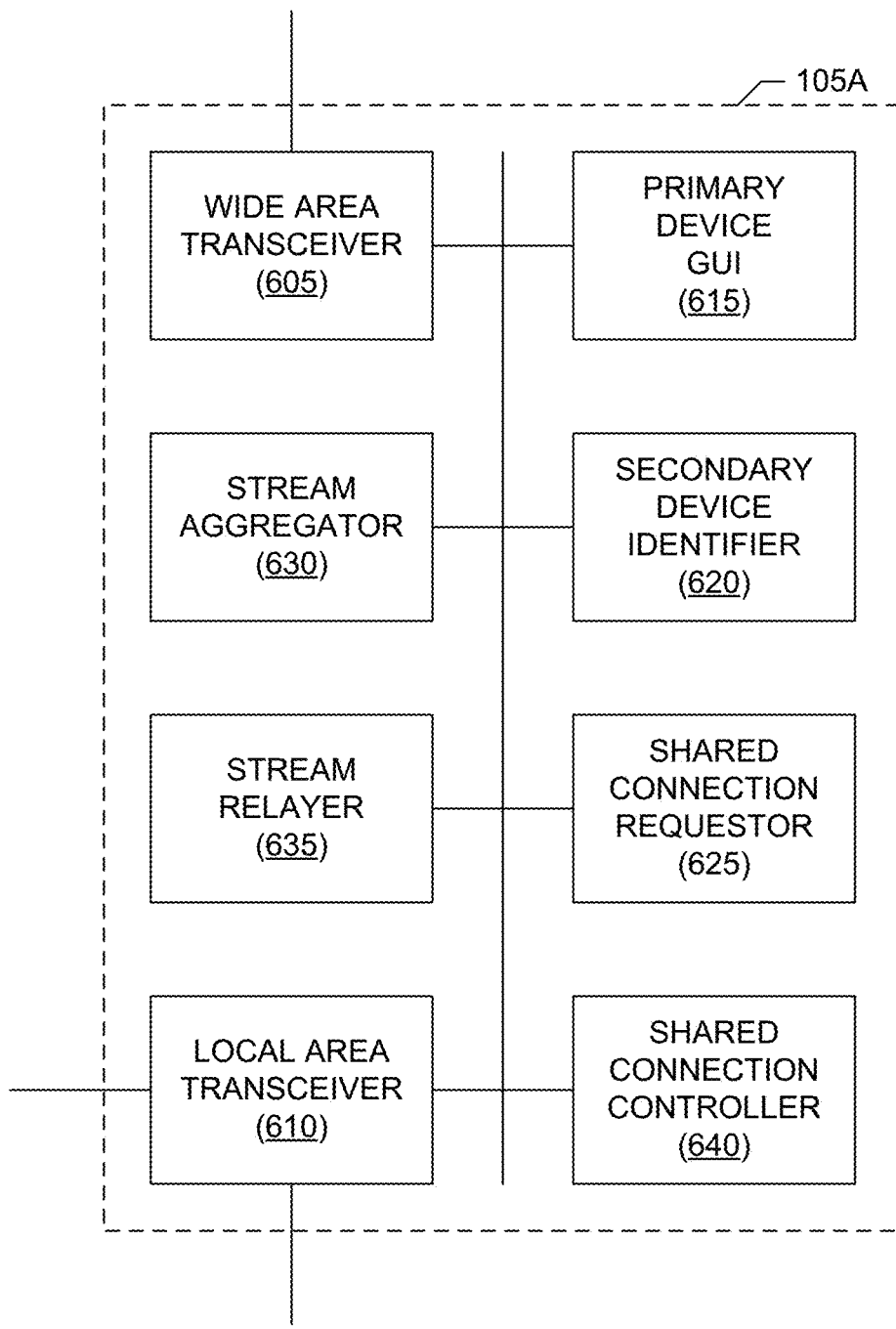
FIG. 4 is block diagram of an example primary device that may be used in the example communication system of FIG. 1.

A block diagram depicting an example implementation of the primary user device 105A of FIG. 1 is illustrated in FIG. 4. The example primary user device 105A of FIG. 4 includes an example wide area transceiver 605 that implements any number and/or type(s) of wireline and/or wireless communication interfaces, protocols, etc., to communicate with one or more of service provider networks, such as the service provider network(s) 110. The primary user device 105A of FIG. 4 also includes an example local area transceiver 610 that implements any number and/or type(s) of wireline and/or wireless communication interfaces, protocols, etc., to implement one or more local data connections with one or more secondary devices, such as the secondary devices 105B-E. For example, the local area transceiver 610 can implement local data connections with other secondary devices via an ad-hoc network, tethering and/or any external data connection (such as a Wi-Fi connection, a Bluetooth connection, a universal serial bus (USB) connection, a docking connection, etc.).

The example primary user device 105A of FIG. 4 further includes an example primary device graphical user interface (GUI) 615 to provide an interface by which a user may invoke, monitor, modify, etc., a shared connection for distributing a data stream among multiple user devices, as disclosed herein. For example, the primary device GUI 615 can be implemented by an Internet browser, a wireless application protocol (WAP) browser, a JAVA application, etc. In some examples, the primary device GUI 615 provides an interface to enable a user to select a target data source, such as one of the target data source(s) 115, that is to provide the data stream whose communication is to be distributed among the multiple user devices via the shared connection. In some examples, the primary device GUI 615 also provides an interface to enable a user to select and/or otherwise identify the secondary devices, such as the secondary devices 105B-E, to be included with the primary user device 105A in the shared connection. For example, the primary device GUI 615 can cause the primary user device 105A to initiate any type of automated discovery process to detect the secondary device(s) 105B-E that are within communication range of the primary user device 105A. Additionally or alternatively, the primary device GUI 615 may implement an interface to enable the user to manually enter secondary device identification information, such as phone number(s), URI(s), etc., for the secondary device(s) 105B-E to be included with the primary device 105A in the shared connection. Furthermore, in some examples, the primary device GUI 615 provides an interface to enable the user to initiate establishment of the shared connection via which communication of a data stream is to be distributed among the multiple user devices. Also, in some examples, the primary device GUI 615 enables a user to specify whether location information for the primary device 105A is to be included in requests to establish such shared connections.

The example primary user device 105A of FIG. 4 further includes an example secondary device identifier 620 to identify the secondary devices, such as the secondary devices 105B-E, to be included with the primary user device 105A in the shared connection. For example, the primary device GUI 615 can initiate any type of automated discovery process to detect (e.g., via communication links established by the local area transceiver 610) the secondary device(s) 105B-E that are within communication range of the primary user device 105A. Additionally or alternatively, the primary device GUI 615 may receive secondary device identification information, such as phone number(s), URI(s), etc., entered manually via the primary device GUI 615 for the secondary device(s) 105B-E to be included with the primary device 105A in the shared connection.

The example primary user device 105A of FIG. 4 also includes an example shared connection requestor 625 to generate and send a shared connection request, as described above, to a distribution system, such as the distribution system 120, to request establishment of a shared connection via which communication of a data stream from an identified target data source is to be distributed. For example, the shared connection requestor 625 can generate a shared connection request message including target source identification information (e.g., specified via the primary device GUI 615) specifying the target data source 115 from which the data stream to be distributed is to be provided. Additionally or alternatively, in some examples, the shared connection request message generated by the shared connection requestor 625 can indicate the number of secondary devices 105B-E to be included in the requested shared connection.

The example primary user device 105A of FIG. 4 further includes an example stream aggregator 630 to reorder and/or otherwise aggregate partial data streams received from other user devices 105B-E to form the complete data stream being provided by the target data source 115 identified in the shared connection request generated and sent to the distribution system 120 via the shared connection requestor 625. For example, the stream aggregator 630 of the illustrated example can receive, via the local communication links established using the local area transceiver 610, one or more of the partial data streams from the secondary user devices 105B-E that each form a part of the complete data stream being provided by the target data source 115. In some examples, the stream aggregator 630 receives the partial data streams from all of the secondary user devices 105B-E and aggregates the partial data streams (e.g., possibly after reordering to account for different data packet arrival times at the different user devices 105A-E) to form the complete data stream being provided by the target data source 115. In some examples supporting hierarchical aggregation as described above, the stream aggregator 630 receives the partial data streams from a subset of one or more of the secondary user devices 105B-E and aggregates the partial data streams (e.g., possibly after reordering to account for different data packet arrival times at the different user devices 105A-E) to form an intermediate aggregated data stream to be provided to another user device, or any other device, that is to aggregate other intermediate aggregated data streams determined by other(s) of the devices 105A-E to form the complete data stream.

The example primary user device 105A of FIG. 4 also includes an example stream relayer 635 to relay (e.g., via the local area transceiver 610) the complete aggregated data stream, or an intermediate aggregated data stream in the case of an example hierarchical aggregation implementation, to a recipient. For example, the stream relayer 635 can communicate the complete data stream from the target data source 115, which is formed by the stream aggregator 630 through aggregating all of the partial data streams received by the primary user device 105A and the secondary user devices 105B-E, to the output device 125 for further processing, presentation, etc. As another example, the stream relayer 635 can communicate an intermediate aggregated data stream formed by the stream aggregator 630 through aggregating a subset of the partial data streams received by the primary user device 105A and the secondary user devices 105B-E to another of the user devices 105B-E for further aggregation.

In some examples, the primary user device 105A of FIG. 4 includes an example shared connection controller 640 to monitor and/or otherwise control the shared connection established in response to the shared connection request generated and sent by the shared connection requestor 625. For example, the shared connection controller 640 can detect, via data communications exchanged via the local area transceiver 610, one or more secondary user devices, such as one or more of the secondary devices 105B-E, entering or leaving an operating area, or otherwise becoming available or unavailable. Additionally or alternatively, the shared connection controller 640 can interface with the primary device GUI 615 to enable a user to manually enter changes in the composition of the secondary devices 105B-E to be included in the shared connection via which communication of the data stream provided by the target data source 115 is to be distributed. The shared connection controller 640 can then report such changes in the composition of the secondary devices 105B-E associated with the existing shared connection to enable the distribution system 120 to modify the shared connection accordingly.

Figure 5:
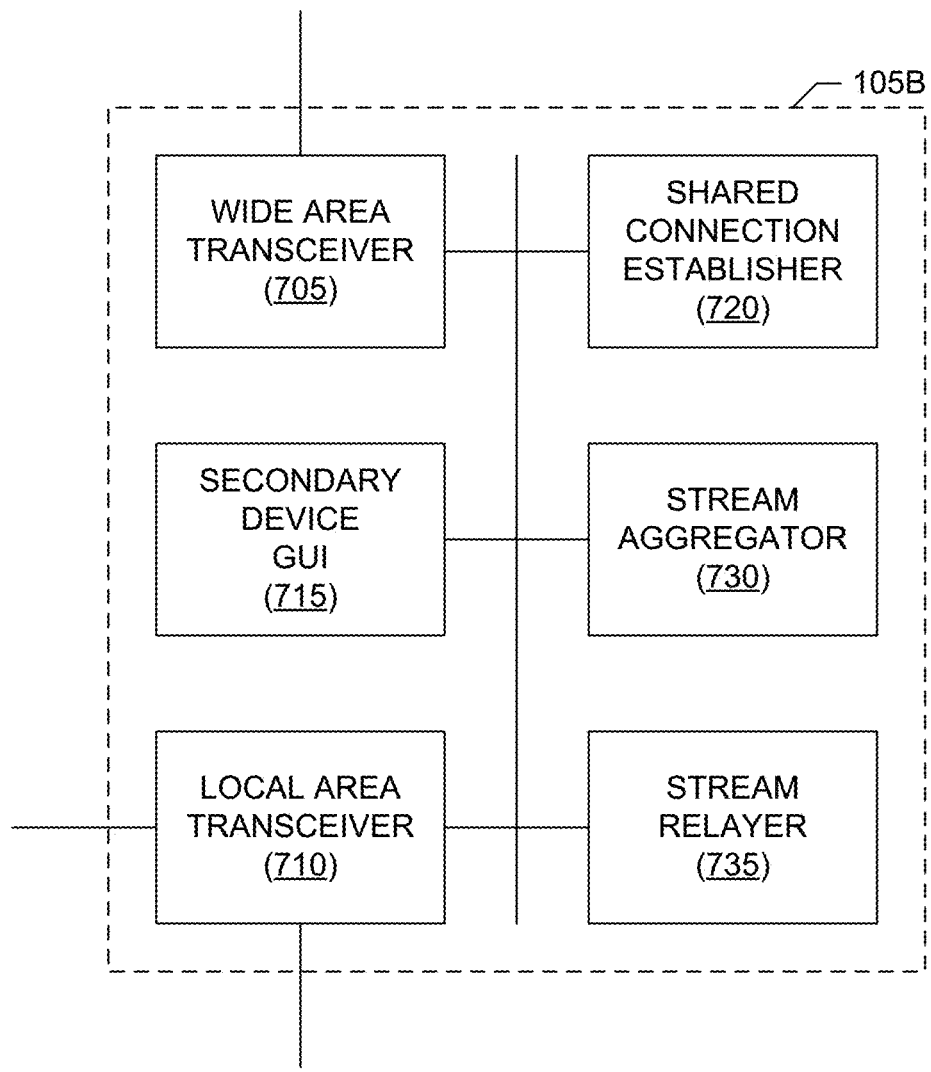
FIG. 5 is block diagram of an example secondary device that may be used in the example communication system of FIG. 1.

A block diagram depicting an example implementation of any one of the secondary user devices 105B-E of FIG. 1 is illustrated in FIG. 5. For convenience and without loss of generality, the example block diagram of FIG. 5 is described from the perspective of implementing the secondary user device 105B, but the example of FIG. 5 could additionally or alternatively be used to implement other ones of the secondary user devices 105B-E. Turning to FIG. 5, the example secondary user device 105B of the illustrated example includes an example wide area transceiver 705 and an example local area transceiver 710, which may be similar to the wide area transceiver 605 and the example local area transceiver 610 included in the example primary user device 105A of FIG. 4.

In the illustrated example of FIG. 5, the example secondary user device 105B also includes an example secondary device GUI 715 to provide an interface by which a user may cause the secondary device 105B to join a shared connection being established by a primary user device, such as the primary user device 105A. For example, the secondary device GUI 715 can be implemented by an Internet browser, a WAP browser, a JAVA application, etc. In some examples, the secondary device GUI 715 provides an interface to enable a user to cause the secondary user device 105B to announce (e.g., via data communications using the local area transceiver 710) its availability for joining a group of user devices, such as the group of devices 105A-E, to be included in a shared connection request. In some examples, the secondary device GUI 715 additionally or alternatively provides an interface to enable a user to initiate establishment (e.g., based on a received network address and/or sharing code, as described above) of a data connection with a distribution system, such as the distribution system 120, which is to receive a partial data stream as part of a shared connection being used to distribute a data stream among multiple user devices. Also, in some examples, the secondary device GUI 715 enables a user to specify whether location information for the secondary device 105B is to be included in communications sent to the distribution system 120. In some examples, the secondary device GUI 715 additionally or alternatively provides an interface to enable a user to update the availability of the secondary user device 105B for inclusion in an existing shared connection. In such examples, in response to receiving a status update via the secondary device GUI 715, the secondary user device 105B can send the status update via the local area transceiver 710 to the primary user device 105A for reporting via its shared connection controller 640.

The example secondary user device 105B of FIG. 5 further includes an example shared connection establisher 720 to establish a data connection with a distribution system, such as the distribution system 120, to thereby join a shared connection being used to distribute communication of a data stream among multiple devices. For example, the secondary user device 105B may receive a network address (e.g., an IP address, URI, etc.) and/or a sharing code from the primary user device 105A for use in establishing a data connection with the distribution system 120 to thereby join a shared connection that was requested by the primary user device 105A for the purpose of distributing communication of a data stream from a target data source 115 among multiple devices, including the secondary user device 105B. In response to receiving such a network address and/or sharing code, the shared connection establisher 720 contacts the distribution system 120 (e.g., automatically or in response to a user input received via the secondary device GUI 715) using the network address and/or sharing code, which causes the distribution system 120 to establish a data connection with the secondary user device 105B, and to also associate the data connection and/or the secondary user device 105B with the shared connection requested by the primary user device 105A.

The example secondary user device 105B of FIG. 5 also includes an example stream aggregator 730 and an example stream relayer 735, which may be similar to the stream aggregator 630 and an example stream relayer 635 included in the primary user device 105A of FIG. 4. For example, the stream relayer 735 may be used to relay or otherwise communicate a partial data stream received via the wide area transceiver 705 of the secondary user device 105B, and associated with a target data stream being communicated by a shared connection, to the primary user device 105A or another of the secondary user devices 105C-E for aggregation to form the complete data stream. Additionally or alternatively, the stream aggregator 730 may be used to aggregate the partial data stream received via the wide area transceiver 705 of the secondary user device 105B with partial data streams from one or more of the user devices 105A, C-E to, for example, implement hierarchical aggregation, as described above.

While example manners of implementing the example communication system 100, the example user devices 105A-E, the example service provider network(s) 110, the example data source(s) 115, the example distribution system 120, the example output device 125, the example distribution server 130, the example connection manager 135, the example data receiver 405, the example stream splitter 410, the example transcoder 415, the example shared connection request receiver 505, the example shared connection allocator 510, the example data stream initiator 515, the example shared connection monitor 520, the example wide area transceiver 605, the example local area transceiver 610, the example primary device GUI 615, the example secondary device identifier 620, the example shared connection requestor 625, the example stream aggregator 630, the example stream relayer 635, the example shared connection controller 640, the example wide area transceiver 705, the example local are transceiver 710, the example secondary device GUI 715, the example shared connection establisher 720, the example stream aggregator 730 and the example stream relayer 735 have been illustrated in FIGS. 1-5, one or more of the elements, processes and/or devices illustrated in FIGS. 1-5 may be combined, divided, re-arranged, omitted, eliminated and/or implemented in any other way. Further, the example user devices 105A-E, the example service provider network(s) 110, the example data source(s) 115, the example distribution system 120, the example output device 125, the example distribution server 130, the example connection manager 135, the example data receiver 405, the example stream splitter 410, the example transcoder 415, the example shared connection request receiver 505, the example shared connection allocator 510, the example data stream initiator 515, the example shared connection monitor 520, the example wide area transceiver 605, the example local area transceiver 610, the example primary device GUI 615, the example secondary device identifier 620, the example shared connection requestor 625, the example stream aggregator 630, the example stream relayer 635, the example shared connection controller 640, the example wide area transceiver 705, the example local are transceiver 710, the example secondary device GUI 715, the example shared connection establisher 720, the example stream aggregator 730, the example stream relayer 735 and/or, more generally, the example communication system 100 of FIGS. 1-5 may be implemented by hardware, software, firmware and/or any combination of hardware, software and/or firmware. Thus, for example, any of the example user devices 105A-E, the example service provider network(s) 110, the example data source(s) 115, the example distribution system 120, the example output device 125, the example distribution server 130, the example connection manager 135, the example data receiver 405, the example stream splitter 410, the example transcoder 415, the example shared connection request receiver 505, the example shared connection allocator 510, the example data stream initiator 515, the example shared connection monitor 520, the example wide area transceiver 605, the example local area transceiver 610, the example primary device GUI 615, the example secondary device identifier 620, the example shared connection requestor 625, the example stream aggregator 630, the example stream relayer 635, the example shared connection controller 640, the example wide area transceiver 705, the example local area transceiver 710, the example secondary device GUI 715, the example shared connection establisher 720, the example stream aggregator 730, the example stream relayer 735 and/or, more generally, the example communication system 100 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example communication system 100, the example user devices 105A-E, the example service provider network(s) 110, the example data source(s) 115, the example distribution system 120, the example output device 125, the example distribution server 130, the example connection manager 135, the example data receiver 405, the example stream splitter 410, the example transcoder 415, the example shared connection request receiver 505, the example shared connection allocator 510, the example data stream initiator 515, the example shared connection monitor 520, the example wide area transceiver 605, the example local area transceiver 610, the example primary device GUI 615, the example secondary device identifier 620, the example shared connection requestor 625, the example stream aggregator 630, the example stream relayer 635, the example shared connection controller 640, the example wide area transceiver 705, the example local are transceiver 710, the example secondary device GUI 715, the example shared connection establisher 720, the example stream aggregator 730 and/or the example stream relayer 735 are hereby expressly defined to include a tangible computer readable medium such as a memory, digital versatile disk (DVD), compact disk (CD), Blu-ray Disc™, etc., storing such software and/or firmware. Further still, the examples of FIGS. 1-5 may include one or more elements, processes and/or devices in addition to, or instead of, those illustrated in FIGS. 1-5, and/or may include more than one of any or all of the illustrated elements, processes and devices.

Flowcharts representative of example machine readable instructions for implementing the example communication system 100, the example user devices 105A-E, the example service provider network(s) 110, the example data source(s) 115, the example distribution system 120, the example output device 125, the example distribution server 130, the example connection manager 135, the example data receiver 405, the example stream splitter 410, the example transcoder 415, the example shared connection request receiver 505, the example shared connection allocator 510, the example data stream initiator 515, the example shared connection monitor 520, the example wide area transceiver 605, the example local area transceiver 610, the example primary device GUI 615, the example secondary device identifier 620, the example shared connection requestor 625, the example stream aggregator 630, the example stream relayer 635, the example shared connection controller 640, the example wide area transceiver 705, the example local are transceiver 710, the example secondary device GUI 715, the example shared connection establisher 720, the example stream aggregator 730 and/or the example stream relayer 735 are shown in FIGS. 6-9. In these examples, the machine readable instructions represented by each flowchart may comprise one or more programs for execution by a processor, such as the processor 1812 shown in the example processing system 1800 discussed below in connection with FIG. 10. The one or more programs, or portion(s) thereof, may be embodied in software stored on a tangible computer readable medium such as a CD-ROM, a floppy disk, a hard drive, a digital versatile disk (DVD), a Blu-ray Disc™, or a memory associated with the processor 1812, but the entire program or programs and/or portions thereof could alternatively be executed by a device other than the processor 1812 (e.g., such as a controller and/or any other suitable device) and/or embodied in firmware or dedicated hardware (e.g., implemented by an ASIC, a PLD, an FPLD, discrete logic, etc.). Also, one or more of the machine readable instructions represented by the flowchart of FIGS. 6-9 may be implemented manually. Further, although the example machine readable instructions are described with reference to the flowcharts illustrated in FIGS. 6-9, many other methods of implementing the example communication system 100, the example user devices 105A-E, the example service provider network(s) 110, the example data source(s) 115, the example distribution system 120, the example output device 125, the example distribution server 130, the example connection manager 135, the example data receiver 405, the example stream splitter 410, the example transcoder 415, the example shared connection request receiver 505, the example shared connection allocator 510, the example data stream initiator 515, the example shared connection monitor 520, the example wide area transceiver 605, the example local area transceiver 610, the example primary device GUI 615, the example secondary device identifier 620, the example shared connection requestor 625, the example stream aggregator 630, the example stream relayer 635, the example shared connection controller 640, the example wide area transceiver 705, the example local are transceiver 710, the example secondary device GUI 715, the example shared connection establisher 720, the example stream aggregator 730 and/or the example stream relayer 735 may alternatively be used. For example, with reference to the flowcharts illustrated in FIGS. 6-9, the order of execution of the blocks may be changed, and/or some of the blocks described may be changed, eliminated, combined and/or subdivided into multiple blocks.

As mentioned above, the example processes of FIGS. 6-9 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 6-9 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise. Furthermore, as used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Figure 6:
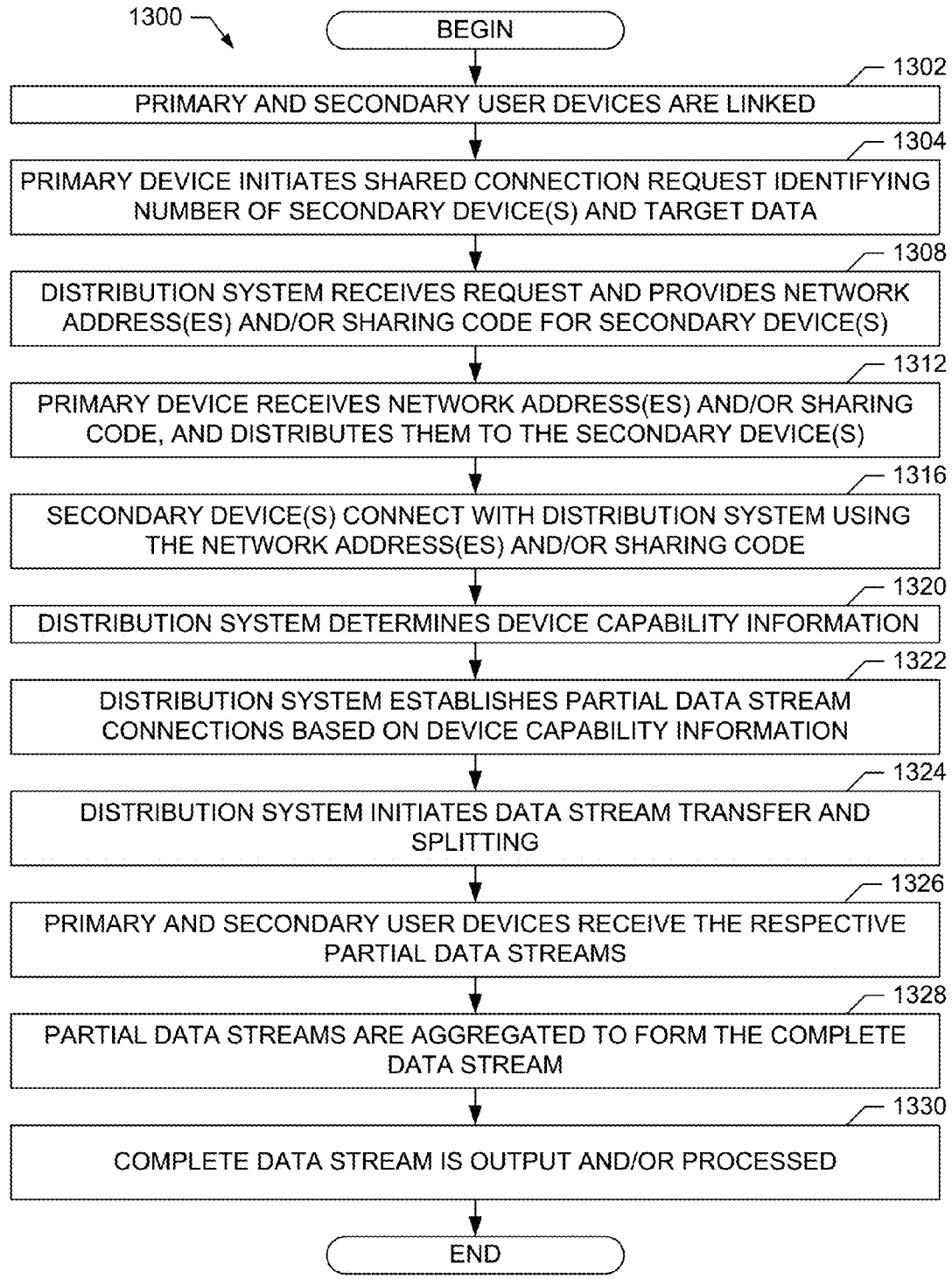
FIG. 6 is a flowchart representative of example machine readable instructions that may be executed to implement the example communication system of FIG. 1.

Example machine readable instructions 1300 that may be executed to implement the example communication system 100 of FIG. 1 are represented by the flowchart shown in FIG. 6. With reference to the preceding figures and associated descriptions, the machine readable instructions 1300 of FIG. 6 begin execution at block 1302 at which the user devices 105A-E are linked via, for example, an ad-hoc network, tethering connections and/or other communication links, as described above. At block 1304, the primary user device 105A initiates a shared connection request to the distribution system 120, as described above. In the illustrated example of FIG. 6, the shared connection request includes information identifying a number of secondary user devices 105B-E to be included in the shared connection being requested. The shared connection request initiated at block 1304 also includes information identifying the target data (e.g., the target data source 115) that is to provide the data stream whose communication is to be distributed among the user devices 105A-E identified by the shared connection request.

At block 1308, the distribution system 120 receives the shared connection request from the primary user device 105A and uses the number of secondary devices indicated in the request to determine a number of network addresses to be provided to the secondary devices 105B-E for use in establishing data connections with the distribution system 120, as described above. In some examples, at block 1308 the distribution system 120 additionally or alternatively determines a sharing code to be used to associate user devices with the shared connection being requested, as described above. At block 1308, the distribution system 120 provides the network addresses and/or the sharing code to the primary user device 105A.

At block 1312, the primary user device 105A receives the network addresses and/or the sharing code provided by the distribution system 120 in response to the shared connection request initiated at block 1304. As described above, the primary user device 105A distributes the received network addresses and/or sharing code to the secondary user devices 105B-E via the local communication links established at block 1302. At block 1316, the secondary user devices 105B-E use the network addresses and/or sharing code received from the primary user device 105A to contact the distribution system 120 to thereby establish respective data connections (e.g., secondary data connections) with the user devices 105B-E, as described above, via which communication of a data stream is be distributed. At block 1320, the distribution system 120 determines device capability information for the user devices 105A-E to be included in the requested shared connection. For example, and as described above, the distribution system 120 may exchange communication messages, such a network ping messages, with the user devices 105A-E to determine respective device capability information, such as bandwidth and/or data rate capabilities, network latencies, etc., for the user devices 105A-E.

At block 1322, the distribution system 120 associates data transmission characteristics with the data connections to complete establishment of the data connections with the user devices 105A-E. As described above, the data transmission characteristics determined for the respective data connections are based on the device capability information obtained for the respective user devices 105A-E, thereby causing each data connections to be tailored to its respective user device 105A-E. As described above, the data connections established with the user devices 105A-E are used to convey the partial data streams associated with a complete data stream to the user devices 105A-E.

At block 1324, the distribution system 120 initiates the transfer of the data stream from the target data source 115 identified in the shared connection request, and splits the complete data stream into partial data streams to be communicated to the user devices 105A-E via the established data connections, as described above. At block 1326, the user devices 105A-E receive their respective partial data streams via their respective data connections with the distribution system 120. At block 1328, the partial data streams are aggregated, as described above, to form the complete data stream being provided by the target data source 115. At block 1330, the complete data stream formed by aggregating the partial data streams is output to, for example, the output device 125 and/or processed by one of the user devices, such as the primary user device 105A.

Figure 7:
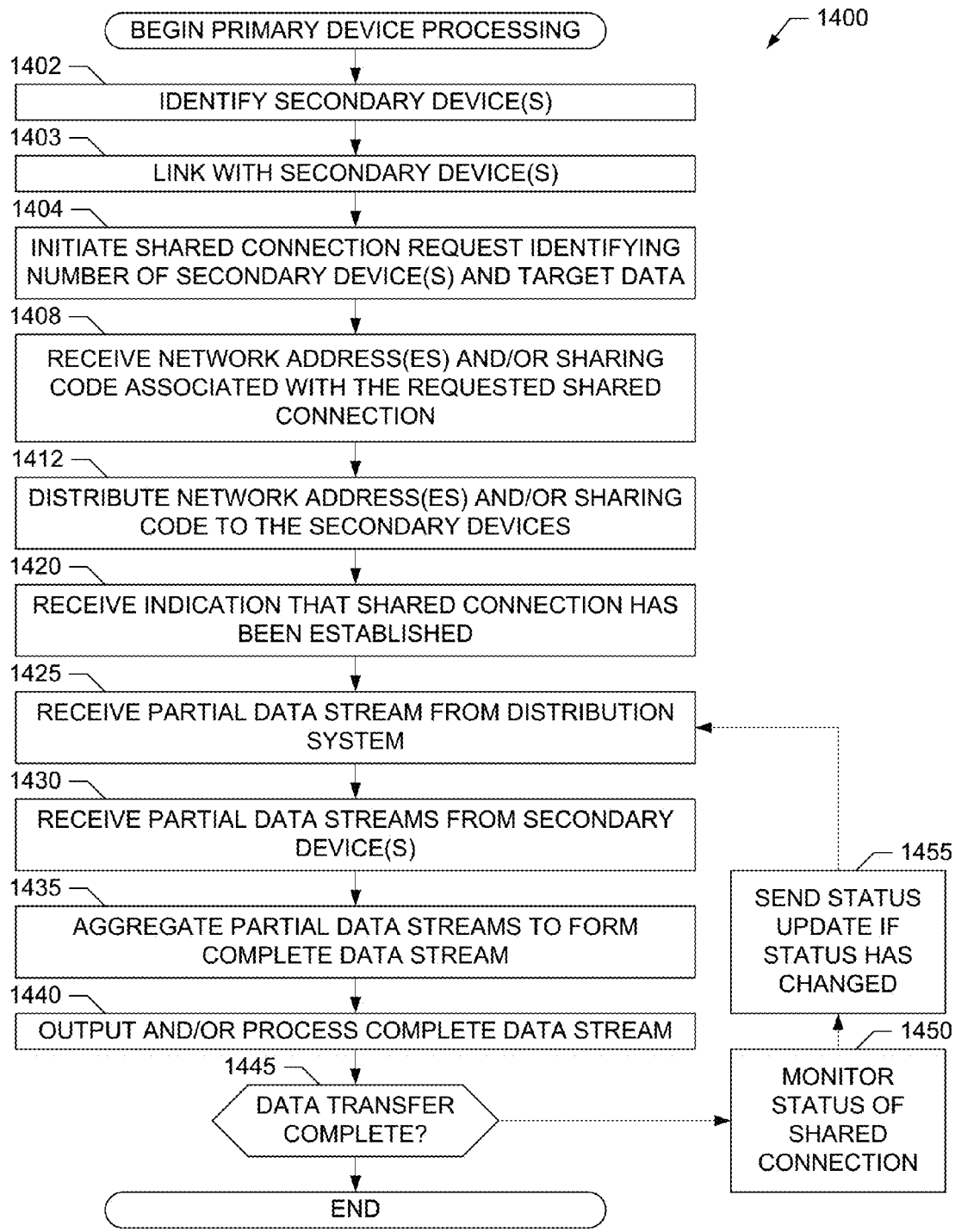
FIG. 7 is a flowchart representative of example machine readable instructions that may be executed to implement the example primary device of FIG. 4.

Example machine readable instructions 1400 that may be executed to implement the example primary user device 105A of FIGS. 1 and/or 4 are represented by the flowchart shown in FIG. 7. For convenience, and without loss of generality, execution of the machine readable instructions 1400 is described in the context of the primary user device 105A operating in the example communication system 100 of FIG. 1. Turning to FIG. 7, and with reference to the preceding figures and associated descriptions, the machine readable instructions 1400 begin execution at block 1402 at which the secondary device identifier 620 of the primary user device 105A identifies the secondary user devices 105B-E to be included in a shared connection for distributing communication of a data stream from a target data source 115. For example, at block 1402, the primary user device 105A can use an auto-discovery procedure, information entered via the primary device GUI 615, etc., to identify the secondary user devices 105B-E, as described above. At block 1403, the primary user device 105A uses its local area transceiver 610 to establish local communication links, such as tethering links, an ad-hoc network, etc., with the secondary user devices 105B-E identified at block 1402.

At block 1404, the shared connection requestor 625 of the primary user device 105A generates and sends a shared connection request to the distribution system 120 to request a shared connection for distributing communication of a data stream being provided by an identified target data source 115. In the illustrated example of FIG. 7, the shared connection request includes information identifying the number of secondary user devices 105B-E to be included in the shared connection being requested. The shared connection request initiated at block 1015 also includes information identifying the target data (e.g., the target data source 115) that is to provide the data stream whose communication is to be distributed among the user devices 105A-E.

At block 1408, the shared connection requestor 625 receives one or more network addresses and/or a sharing code from the distribution system 120 in response to the shared connection request initiated at block 1404, as described above. At block 1412, the shared connection requestor 625 distributes (e.g., via the local communication links established at block 1010) the network addresses and/or the sharing code to the secondary user devices 105B-E to be included in the shared connection, as described above. For example, the number of network addresses received at block 1408 may correspond to the number of secondary user devices 105B-E indicated in the shared connection request. In such examples, the shared connection requestor 625 of the primary user device 105A may forward a different network address to each respective secondary user device 105B-E. As noted above, the network addresses and/or sharing code distributed to the secondary user devices 105B-E are used by the secondary user device 105B-E to establish respective data connections with the distribution system 120.

At block 1420, the primary user device 105A receives an indication from the distribution system 120 (e.g., via a message received from the service provider network 110 by the wide area transceiver 605 of the primary user device 105A) indicating that the requested shared connection has been established. For example, the distribution system 120 may send such an indication to the primary user device 105A after the data connections have been established (e.g., based on the device identification information included in the request) with all of the user devices 105A-E that are to be included in the shared connection. After the shared connection is established, at block 1425, the primary user device 105A begins receiving, via its wide area transceiver 605, a partial data stream corresponding to a portion of the complete data stream being provided by the target data source 115 identified in the shared connection request.

At block 1430, the stream aggregator 630 of the primary user device 105A receives, via the local communication links established at block 1403, the partial data streams received by the other (e.g., secondary) user devices 105B-E included in the shared connection. At block 1435, the stream aggregator 630 aggregates, as described above, the partial data streams (e.g., possibly after reordering to account for different data packet arrival times at the different user devices 105A-E) to form the complete data stream being provided by the target data source 115. At block 1440, the primary user device 105A performs any appropriate post-processing on the aggregated, complete data stream, and/or the stream relayer 635 of the primary user device 105A outputs the complete data stream for use by another device, such as the output device 125.

If the transfer of the data stream is not complete and, thus, the data stream is still being communicated (block 1445), then at block 1450, the shared connection controller 640 of the primary user device 105A monitors the status of the shared connection, as described above. For example, the shared connection controller 640 can detect changes in the composition (e.g., membership) of the group of user devices 105A-E (e.g., such as when device(s) enter and/or leave an operating area) automatically (e.g., via communications exchanged using the local area transceiver 610) and/or manually (e.g., via information entered via the primary device GUI 615). At block 1455, the shared connection controller 640 sends (e.g., via its wide area transceiver 605) any status updates to the distribution system 120. Processing then returns to block 1425 and blocks subsequent thereto at which the primary user device 105A continues to receive its partial data stream corresponding to a portion of the complete data stream being provided by the target data source 115 (although the data transmission characteristic(s) of the partial data stream may be modified by the distribution system 120 in response to status update(s) received via the processing at block 1455).

Figure 8:
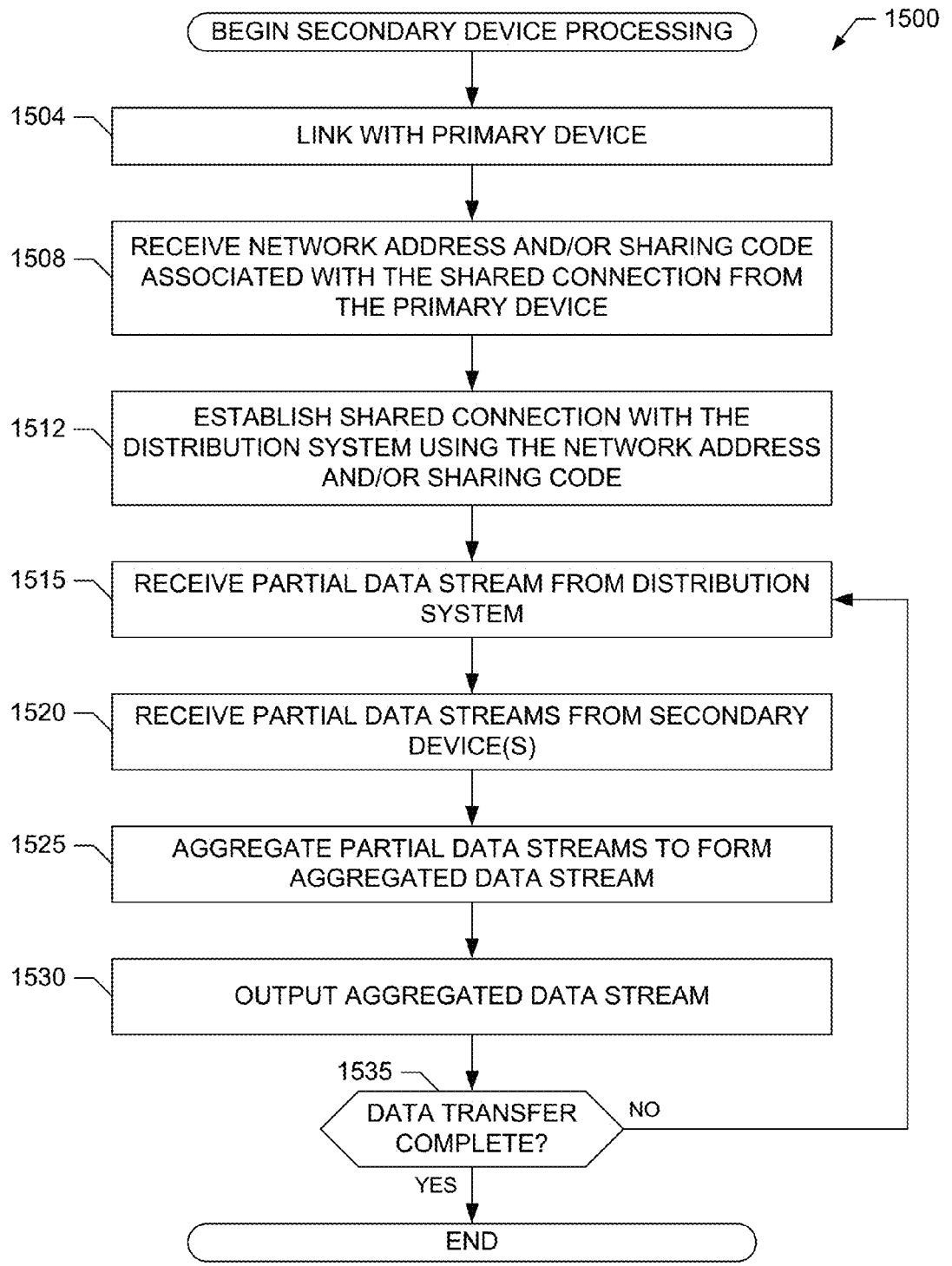
FIG. 8 is a flowchart representative of example machine readable instructions that may be executed to implement the example secondary device of FIG. 5.

Example machine readable instructions 1500 that may be executed to implement one or more of the example secondary user devices 105B-E of FIGS. 1 and/or 5 are represented by the flowchart shown in FIG. 8. For convenience, and without loss of generality, execution of the machine readable instructions 1500 is described in the context of the secondary user device 105B operating in the example communication system 100 of FIG. 1. Turning to FIG. 8, and with reference to the preceding figures and associated descriptions, the machine readable instructions 1500 begin execution at block 1504 at which the secondary user device 105B uses its local area transceiver 710 to establish a local communication link with a primary device, such as the primary user device 105A, as described above. At block 1508, the shared connection establisher 720 of the secondary user device 105B receives a network address and/or a sharing code from the primary user device 105A for use in establishing a data connection with the distribution system 120, as described above. At block 1512, the shared connection establisher 720 establishes the data connection with the distribution system 120 using the received network address and/or sharing code, as described above.

At block 1515, the secondary user device 105B begins receiving, via its wide area transceiver 705, a partial data stream corresponding to a portion of the complete data stream being provided by a target data source 115 (e.g., which is the subject of the shared connection in which the secondary user device 105B has joined). In some examples, such as examples supporting hierarchical aggregation, at block 1520, the stream aggregator 730 of the secondary user device 105B receives, via local communication links established using its local area transceiver 710, the partial data stream(s) received by one or more of the other user devices 105A, C-E included in the shared connection. At block 1525, the stream aggregator 730 aggregates, as described above, the partial data streams (e.g., possibly after reordering to account for different data packet arrival times at the different user devices 105A-E) to form, for example, an intermediate aggregated data stream corresponding to a portion of the complete data stream being provided by the target data source 115. At block 1530, the stream relayer 735 of the secondary user device 105B outputs the intermediate aggregated data stream for use by another device, such as the primary user device 105A, to complete the hierarchical aggregation process. If the transfer of the data stream is not complete and, thus, the data stream is still being communicated (block 1535), then processing then returns to block 1515 and blocks subsequent thereto at which the secondary user device 105B continues to receive its partial data stream corresponding to its portion of the complete data stream being provided by the target data source 115 (although the data transmission characteristic(s) of the partial data stream may be modified by the distribution system 120 in response to changes in the status of the shared connection, as described above).

Figure 9:
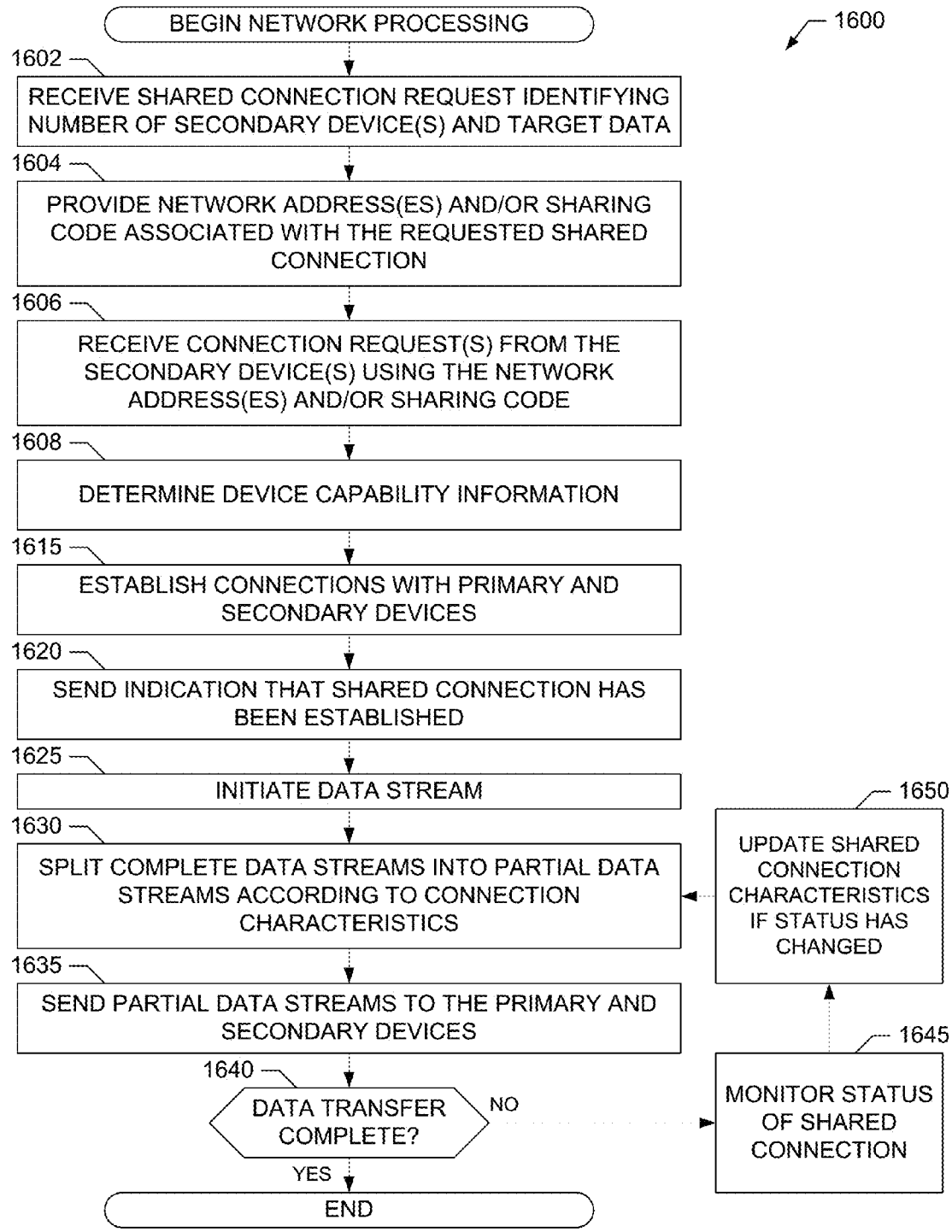
FIG. 9 is a flowchart representative of example machine readable instructions that may be executed to implement the example distribution server of FIG. 2 and/or the example connection manager of FIG. 3.

Example machine readable instructions 1600 that may be executed to implement the example distribution system 120 and, more particularly, the example distribution server 130 and/or the example connection manager 135 of FIGS. 1-3 are represented by the flowchart shown in FIG. 9. For convenience, and without loss of generality, execution of the machine readable instructions 1600 is described in the context of the distribution server 130 and the connection manager 135 operating in the example communication system 100 of FIG. 1. Turning to FIG. 9, and with reference to the preceding figures and associated descriptions, the machine readable instructions 1600 begin execution at block 1602 at which the shared connection request receiver 505 of the connection manager 135 receives a shared connection request from the primary user device 105A, as described above. In the illustrated example, the shared connection request includes information identifying the number of secondary devices 105B-E to be included in the shared connection. In some examples, the shared connection request may count the primary user device 105A in a total number of user devices 105A-E in the shared connection request, or the primary user device 105A may be implicitly assumed to be included in the shared connection and, thus, not included in the number of user devices 105B-E indicated in the request. In the illustrated example, the shared connection request received at block 1602 also includes data source identification information identifying a target data source 115 that is to provide a data stream whose communication is to be distributed using the requested shared connection.

At block 1604, the shared connection allocator 510 provides one or more network addresses and/or a sharing code to the primary user device 105A in response to the received shared connection request. For example, and a described above, the shared connection allocator 510 may provide a number of network addresses corresponding to the number of secondary user devices 105B-E indicated in the shared connection request, where each network address is associated with a respective data connection to be established with one of the secondary user devices 105B-E. In some examples, the shared connection allocator 510 provides the sharing code in addition or as an alternative to the network addresses, where the sharing code is to be used by the user devices 105A-E to indicate that they belong to a particular, requested shared connection. At block 1606, the shared connection allocator 510 receives connection requests from the secondary user devices 105B-E at the provided network address(es) and/or including the provided sharing code, and establishes respective data connections with the secondary user devices 105B-E in response to receiving the requests, as described above. At block 1608, the shared connection allocator 510 actively determines device capability information for the user devices 105A-E to be included in the requested shared connection by, for example, exchanging communication messages, such a network ping messages, with each user device 105A-E to determine/measure device capability information, such as bandwidth and/or data rate capabilities, network latencies, etc.

At block 1615, the shared connection allocator 510 establishes respective data connections with the user devices 105A-E by associated respective data transmission capabilities with the initial data connection established with the user devices 105A-E by the service provider network 110, as described above. For example, the data transmission capabilities to be associated with each data connection can be determined by the shared connection allocator 510 using the device capability information obtained for the particular user device associated with the data connection, as further described above.

At block 1620, the connection manager 135 sends an indication to the primary user device 105A that the shared connection has been established in response to the request received at block 1602. At block 1625, the data stream initiator 515 of the connection manager 135 initiates transfer of a data stream from the target data source 115 using the source identification information included in the request received at block 1602. At block 1630, the data receiver 405 of the distribution server 130 receives the data stream from the target data source 115, and the stream splitter 410 of the distribution server 130 splits the incoming data stream into partial data streams according to the data transmission characteristics associated with the respective data connections established with the user devices 105A-E, as described above. In some examples, at block 1630, the transcoder 415 of the distribution server 130 may be invoked to perform transcoding of the partial data streams to conform them to the capabilities of the user devices 105A-E. At block 1635, the stream splitter 410 sends the partial data streams to the user devices 105A-E using the established data connections, as described above.

If the transfer of the data stream is not complete and, thus, the data stream is still being received and split by the distribution server 130 (block 1640), then at block 1645, the shared connection monitor 520 of the connection manager 135 monitors the status of the shared connection, as described above. At block 1650, the shared connection allocator 510 updates the shared connection characteristics, as appropriate, in response to any detected changes in the status of the shared connection. For example, the shared connection allocator 510 may cause removal of the data connection(s) for any user device(s) 105A-E that are no longer available, establishment of new data connection(s) for new user device(s) that become available, modification of data transmission characteristics associated with one or more of the established data connections based on detection of changes to the device capability, link status, etc., and/or any other appropriate change to the shared connection. Processing then returns to block 1630 and blocks subsequent thereto at which the distribution server 120 continues to receive the incoming data stream and to split it into its component partial data streams for sending to the user devices 105A-E (although the data transmission characteristic(s) of the partial data stream may be modified in response to status update(s) received via the processing at block 1650).

Figure 10:
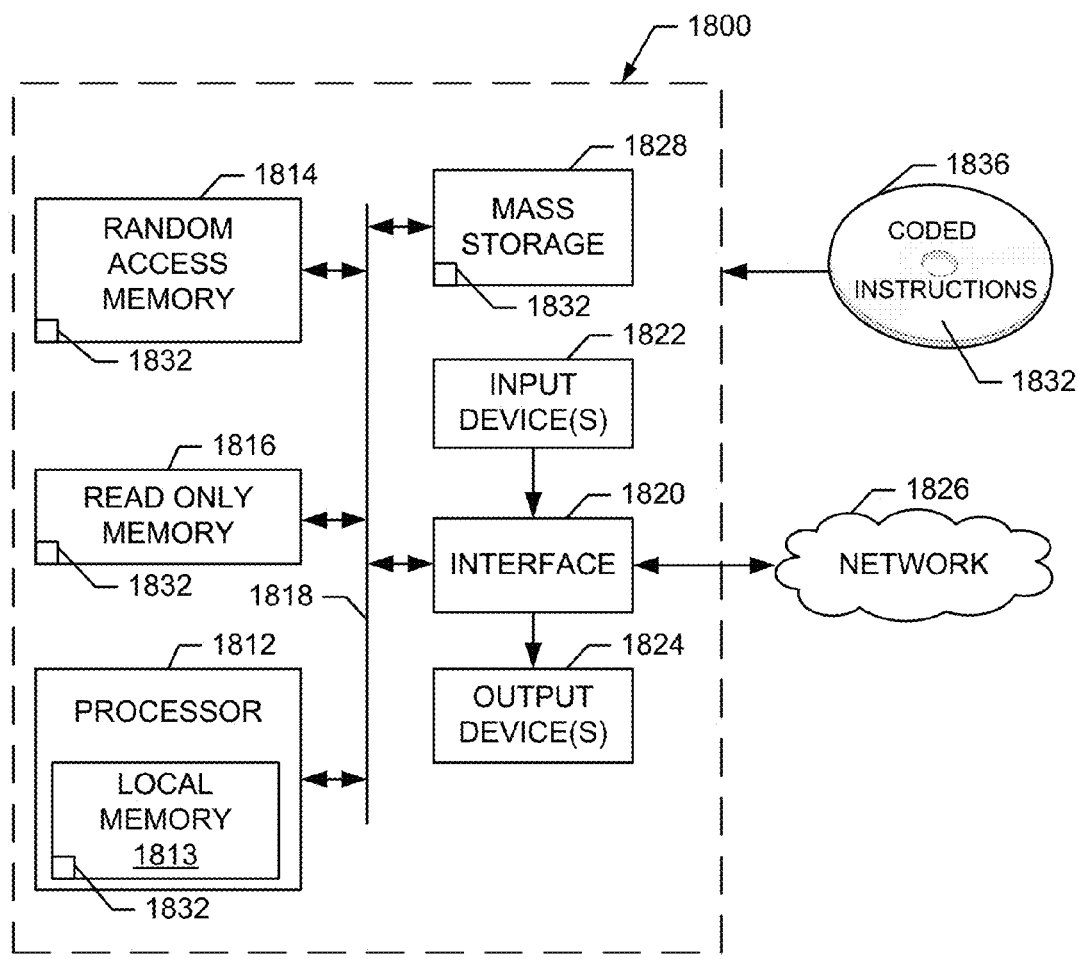
FIG. 10 is a block diagram of an example processing system that may execute the example machine readable instructions of FIGS. 6-8 and/or 9 to implement the example communication system of FIG. 1, the example distribution server of FIG. 2, the example connection manager of FIG. 3, the example primary device of FIG. 4 and/or the example secondary device of FIG. 5.

FIG. 10 is a block diagram of an example processing system 1800 capable of executing the instructions of FIGS. 6-9 to implement the example communication system 100, the example user devices 105A-E, the example service provider network(s) 110, the example data source(s) 115, the example distribution system 120, the example output device 125, the example distribution server 130, the example connection manager 135, the example data receiver 405, the example stream splitter 410, the example transcoder 415, the example shared connection request receiver 505, the example shared connection allocator 510, the example data stream initiator 515, the example shared connection monitor 520, the example wide area transceiver 605, the example local area transceiver 610, the example primary device GUI 615, the example secondary device identifier 620, the example shared connection requestor 625, the example stream aggregator 630, the example stream relayer 635, the example shared connection controller 640, the example wide area transceiver 705, the example local are transceiver 710, the example secondary device GUI 715, the example shared connection establisher 720, the example stream aggregator 730 and/or the example stream relayer 735 of FIGS. 1-5. The processing system 1800 can be, for example, a server, a personal computer, a mobile phone (e.g., a smartphone, a cell phone, etc.), a personal digital assistant (PDA), an Internet appliance, a DVD player, a CD player, a digital video recorder, a Blu-ray player, a gaming console, a personal video recorder, a set top box, a digital camera, or any other type of computing device.

The system 1800 of the instant example includes a processor 1812. For example, the processor 1812 can be implemented by one or more microprocessors and/or controllers from any desired family or manufacturer.

The processor 1812 includes a local memory 1813 (e.g., a cache) and is in communication with a main memory including a volatile memory 1814 and a non-volatile memory 1816 via a bus 1818. The volatile memory 1814 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1816 may be implemented by flash memory and/or any other desired type of memory device. Access to the main memory 1814, 1816 is controlled by a memory controller.

The processing system 1800 also includes an interface circuit 1820. The interface circuit 1820 may be implemented by any type of interface standard, such as an Ethernet interface, a universal serial bus (USB), and/or a PCI express interface.

One or more input devices 1822 are connected to the interface circuit 1820. The input device(s) 1822 permit a user to enter data and commands into the processor 1812. The input device(s) can be implemented by, for example, a keyboard, a mouse, a touchscreen, a track-pad, a trackball, a trackbar (such as an isopoint), a voice recognition system and/or any other human-machine interface.

One or more output devices 1824 are also connected to the interface circuit 1820. The output devices 1824 can be implemented, for example, by display devices (e.g., a liquid crystal display, a cathode ray tube display (CRT)), a printer and/or speakers. The interface circuit 1820, thus, typically includes a graphics driver card.

The interface circuit 1820 also includes a communication device, such as a modem or network interface card, to facilitate exchange of data with external computers via a network 1826 (e.g., an Ethernet connection, a digital subscriber line (DSL), a telephone line, coaxial cable, a cellular telephone system, etc.).

The processing system 1800 also includes one or more mass storage devices 1828 for storing machine readable instructions and data. Examples of such mass storage devices 1828 include floppy disk drives, hard drive disks, compact disk drives and digital versatile disk (DVD) drives.

Coded instructions 1832 corresponding to the instructions of FIGS. 6-9 may be stored in the mass storage device 1828, in the volatile memory 1814, in the non-volatile memory 1816, in the local memory 1813 and/or on a removable storage medium, such as a CD or DVD 1836.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the claims either literally or under the doctrine of equivalents.

What is claimed is:

1. A method to distribute communication of a first data stream among multiple devices, the method comprising:
   receiving a first request from a primary device to establish a shared connection with a distribution system, the shared connection to distribute the communication of the first data stream among a plurality of devices, the plurality of devices including the primary device and a plurality of secondary devices;
   associating, with a processor of the distribution system, a textual identification code with the first request as an identifier to identify ones of the secondary devices to group into the shared connection;
   providing, to the primary device in response to the first request, the textual identification code and a plurality of network addresses of the distribution system assigned by the distribution system to the first request and allocated to the plurality of secondary devices for sending subsequent requests containing information including the textual identification code from the secondary devices to the distribution system to establish respective secondary data connections between the distribution system and the secondary devices; and splitting the first data stream into a plurality of partial data streams to be communicated respectively to the primary device via a primary data connection and the plurality of secondary devices via the respective secondary data connections, the partial data streams, when aggregated, forming the first data stream.

2. The method of claim 1, wherein a number of the network addresses provided to the primary device corresponds to a number of secondary devices indicated in the request as being included in the shared connection, and the primary device distributes the network addresses to the plurality of secondary devices to be used to establish the respective secondary data connections.

3. The method of claim 1, further including;
establishing the primary data connection between the distribution system and the primary device in response to receiving the first request; and
establishing the respective secondary data connections between the distribution system and the secondary devices in response to receiving the subsequent requests from the plurality of secondary devices at the network addresses provided to the primary device, wherein respective ones of the plurality of secondary devices are associated with respective different ones of the plurality of network addresses provided to the primary device.

4. The method of claim 1, further including:
determining first device capability information for the primary device;
establishing the primary data connection between the distribution system and the primary device based on the first device capability information;
determining respective device capability information for respective ones of the plurality of secondary devices; and
establishing the respective secondary data connections between the distribution system and the secondary devices based on the respective device capability information determined for respective ones of the plurality of secondary devices.

5. The method of claim 4, wherein the determining of the first device capability information includes processing a first ping message sent to the primary device, and the determining of the respective device capability information for respective ones of the plurality of secondary devices includes processing respective ping messages sent to the respective ones of plurality of secondary devices.

6. The method of claim 4, wherein the establishing of the primary data connection includes associating at least one of a first bandwidth limit or a first data rate limit with the primary data connection based on the first device capability information, and the establishing of the respective secondary data connections includes associating at least one of a respective bandwidth limit or a respective data rate limit with respective ones of the respective secondary data connections based on the respective device capability information determined for respective ones of the plurality of secondary devices.

7. The method of claim 1, further including:
detecting a change in status of the shared connection; and
adjusting the splitting of the first data stream to account for the change in status.

8. A tangible machine readable medium including machine readable instructions which, when executed, cause a processor of a distribution system to perform operations comprising:

associating a textual identification code with a first request received from a primary device requesting to establish a shared connection to distribute communication of a first data stream among a plurality of devices including the primary device and a plurality of the secondary devices, the textual identification code being an identifier to identify ones of the secondary devices to group into the shared connection;
in response to the first request, providing, to the primary device, the textual identification code and network addresses of the distribution system assigned by the distribution system to the first request and allocated to the plurality of secondary devices for sending subsequent requests containing information including the textual identification code from the secondary devices to the distribution system to establish respective secondary data connections between the distribution system and the secondary devices; and
splitting the first data stream into a plurality of partial data streams to be communicated respectively to the primary device via a primary data connection and the plurality of the secondary devices via the respective secondary data connections, the partial data streams, when aggregated, forming the first data stream.

9. The tangible machine readable medium of claim 8, wherein a number of the network addresses provided to the primary device corresponds to a number of secondary devices indicated in the request as being included in the shared connection, and the primary device distributes the network addresses to the plurality of secondary devices to be used to establish the respective secondary data connections.

10. The tangible machine readable medium of claim 8, wherein the operations further include:
establishing the primary data connection with the primary device in response to receiving the first request; and
establishing the respective secondary data connections between the distribution system and the secondary devices in response to receiving the subsequent requests from the plurality of secondary devices at the network addresses provided to the primary device, wherein respective ones of the plurality of secondary devices are associated with respective different ones of the plurality of network addresses provided to the primary device.

11. The tangible machine readable medium of claim 8, wherein the operations further include:
determining first device capability information for the primary device;
establishing the primary data connection between the distribution system the primary device based on the first device capability information;
determining respective device capability information for respective ones of the plurality of secondary devices; and
establishing the respective secondary data connections between the distribution system and the secondary devices based on the respective device capability information determined for respective ones of the plurality of secondary devices.

12. The tangible machine readable medium of claim 11, wherein the determining of the first device capability information includes processing a first ping message sent to the primary device, and the determining of the respective device capability information for respective ones of the plurality of secondary devices includes processing respective ping messages sent to the respective ones of plurality of secondary devices.

13. The tangible machine readable medium of claim 11, wherein the establishing of the primary data connection includes associating at least one of a first bandwidth limit or a first data rate limit with the primary data connection based on the first device capability information, and the establishing of the respective secondary data connections includes associating at least one of a respective bandwidth limit or a respective data rate limit with respective ones of the respective secondary data connections based on the respective device capability information determined for respective ones of the plurality of secondary devices.

14. The tangible machine readable medium of claim 8, wherein the operations further include:
    detecting a change in status of the shared connection; and
    adjusting the splitting of the first data stream to account for the change in status.

15. An apparatus to distribute communication of a first data stream among multiple devices, the apparatus comprising:
    memory including machine readable instructions; and
    a processor responsive to the machine readable instructions to perform operations including:
        accessing a first request from a primary device to establish a shared connection with a distribution system, the shared connection to distribute the communication of the first data stream among a plurality of devices, the plurality of devices including the primary device and a plurality of secondary devices;
        associating, by the distribution system, a textual identification code with the first request as an identifier to identify ones of the secondary devices to group into the shared connection;
        providing, to the primary device in response to the first request, the textual identification code and a plurality of network addresses of the distribution system assigned by the distribution system to the first request and allocated to the plurality of secondary devices for sending subsequent requests containing information including the textual identification code from the secondary devices to the distribution system to establish respective secondary data connections between the distribution system and the secondary devices; and
        splitting the first data stream into a plurality of partial data streams to be communicated respectively to the primary device via a primary data connection and the plurality of secondary devices via the respective secondary data connections, the partial data streams, when aggregated, forming the first data stream.

16. The apparatus of claim 15, wherein a number of the network addresses provided to the primary device corresponds to a number of secondary devices indicated in the request, and the primary device distributes the network addresses to the plurality of secondary devices to be used to establish the respective secondary data connections.

17. The apparatus of claim 15, wherein the operations further include:
    establishing the primary data connection between the distribution system and the primary device in response to receiving the first request; and
    establishing the respective secondary data connections between the distribution system and the secondary devices in response to receiving the subsequent requests from the plurality of secondary devices at the network addresses provided to the primary device, wherein respective ones of the plurality of secondary devices are associated with respective different ones of the plurality of network addresses provided to the primary device.

18. The apparatus of claim 15, wherein the operations further include:
    determining first device capability information for the primary device;
    establishing the primary data connection between the distribution system the primary device based on the first device capability information;
    determining respective device capability information for respective ones of the plurality of secondary devices; and
    establishing the respective secondary data connections between the distribution system and the secondary devices based on the respective device capability information determined for respective ones of the plurality of secondary devices.

19. The apparatus of claim 18, wherein, to determine the first device capability information, the processor is to process a first ping message sent to the primary device, and to determine the respective device capability information for respective ones of the plurality of secondary devices, the processor is to process respective ping messages sent to the respective ones of plurality of secondary devices.

20. The apparatus of claim 18, wherein, to establish the primary data connection, the processor is to associate at least one of a first bandwidth limit or a first data rate limit with the primary data connection based on the first device capability information, and to establish the respective secondary data connections, the processor is to associate at least one of a respective bandwidth limit or a respective data rate limit with respective ones of the respective secondary data connections based on the respective device capability information determined for respective ones of the plurality of secondary devices.

* * * * *